(12) United States Patent
Sugahara et al.

(10) Patent No.: US 11,211,670 B2
(45) Date of Patent: Dec. 28, 2021

(54) ALL-SOLID-STATE BATTERY

(71) Applicant: FUJIFILM BUSINESS INNOVATION CORP., Tokyo (JP)

(72) Inventors: Hajime Sugahara, Kanagawa (JP); Hidekazu Hirose, Kanagawa (JP); Tomoya Sasaki, Kanagawa (JP); Kosaku Yoshimura, Kanagawa (JP); Yasunobu Kashima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 78 days.

(21) Appl. No.: 16/520,844

(22) Filed: Jul. 24, 2019

(65) Prior Publication Data
US 2020/0274126 A1    Aug. 27, 2020

(30) Foreign Application Priority Data
Feb. 22, 2019   (JP) .............................. JP2019-030939

(51) Int. Cl.
*H01M 2/16* (2006.01)
*H01M 50/411* (2021.01)
(Continued)

(52) U.S. Cl.
CPC ....... *H01M 50/411* (2021.01); *H01M 4/0402* (2013.01); *H01M 4/133* (2013.01); *H01M 4/1391* (2013.01); *H01M 10/0525* (2013.01); *H01M 10/0562* (2013.01); *H01M 2004/027* (2013.01); *H01M 2004/028* (2013.01)

(58) Field of Classification Search
CPC ........... H01M 10/052; H01M 10/0525; H01M 10/0562; H01M 2004/027; H01M 2004/028; H01M 2300/0068; H01M 2/1646; H01M 2/1653; H01M 2/1686; H01M 4/0402; H01M 4/133; H01M 4/1391
See application file for complete search history.

(56) References Cited

U.S. PATENT DOCUMENTS

| 7,824,795 B2 | 11/2010 | Yoshida et al. |
| 2017/0279101 A1* | 9/2017 | Sago ................. H01M 10/058 |
| 2018/0166741 A1* | 6/2018 | Xu ........................ H01M 4/13 |

FOREIGN PATENT DOCUMENTS

| JP | 2013-008611 A | 1/2013 |
| JP | 2018-088306 A | 6/2018 |
| WO | 2008/059987 A1 | 5/2008 |

OTHER PUBLICATIONS

Cylinder, https://en.wikipedia.org/wiki/Cylinder#On_the_Sphere_and_Cylinder (Year: 2021).*

(Continued)

*Primary Examiner* — Victoria H Lynch
(74) *Attorney, Agent, or Firm* — Oliff PLC

(57) ABSTRACT

An all-solid-state battery includes a positive electrode active material layer containing a positive electrode active material; a negative electrode active material layer containing a negative electrode active material; and a solid electrolyte layer containing a solid electrolyte and a porous polyimide film which holds the solid electrolyte. The porous polyimide film has a void ratio of 60% or more and 80% or less and a pore diameter of 0.1 μm or more and 10 μm or less.

13 Claims, 2 Drawing Sheets

(51) Int. Cl.
*H01M 10/0525* (2010.01)
*H01M 4/04* (2006.01)
*H01M 4/133* (2010.01)
*H01M 10/0562* (2010.01)
*H01M 4/1391* (2010.01)
*H01M 4/02* (2006.01)

(56) References Cited

OTHER PUBLICATIONS

Ellipsoid, https://en.wikipedia.org/wiki/Ellipsoid (Year: 2021).*

* cited by examiner

ALL-SOLID-STATE BATTERY

CROSS-REFERENCE TO RELATED APPLICATIONS

This application is based on and claims priority under 35 USC 119 from Japanese Patent Application No. 2019-030939 filed Feb. 22, 2019.

BACKGROUND

(i) Technical Field

The present disclosure relates to an all-solid-state battery.

(ii) Related Art

In recent years, attention has been paid to all-solid-state batteries in which a liquid electrolyte is substituted by a solid electrolyte.

Japanese Unexamined Patent Application Publication No. 2018-088306 describes a solid electrolyte composition containing a sulfide-based inorganic solid electrolyte (A) having the ionic conductivity of a metal belonging to the periodic table group 1 or 2, an antioxidant (B), a dispersion medium (C), and a binder (D). The binder (D) contains polyurethane, polyurea, polyamide, and/or polyester.

Japanese Unexamined Patent Application Publication No. 2013-008611 describes an all-solid-state secondary battery including a positive electrode active material layer, a negative electrode active material layer, and a solid electrolyte layer. At least one of the positive electrode active material layer, the negative electrode active material layer, and the solid electrolyte layer contains an inorganic solid electrolyte and a binder composed of a particle polymer and containing a surfactant having a polyoxyethylene chain.

SUMMARY

An all-solid-state battery including a solid electrolyte layer which uses a porous film (for example, a porous polyolefin film) as a holding body for a solid electrolyte may be decreased in battery capacity (may be referred to as "cycle characteristics" hereinafter) when repeatedly charged and discharged.

Aspects of non-limiting embodiments of the present disclosure relate to an all-solid-state battery which suppresses a decrease in battery capacity when repeatedly charged and discharged, as compared with an all-solid-state battery including a solid electrolyte layer using, as a holding body holding the solid electrolyte, a porous polyimide film having a void ratio of less than 60% or over 80%, a porous polyimide film having a pore diameter of less than 0.1 μm or over 10 μm, or a porous polyimide film holding the solid electrolyte filled in pores at a filling rate of less than 55%.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an all-solid-state battery including a positive electrode active material layer containing a positive electrode active material, a negative electrode active material layer containing a negative electrode active material, and a solid electrolyte layer containing a solid electrolyte and a porous polyimide film which holds the solid electrolyte. The porous polyimide film has a void ratio of 60% or more and 80% or less and a pore diameter of 0.1 μm or more and 10 μm or less.

BRIEF DESCRIPTION OF THE DRAWINGS

Exemplary embodiments of the present disclosure will be described in detail based on the following figures, wherein.

DETAILED DESCRIPTION

Figure 1:
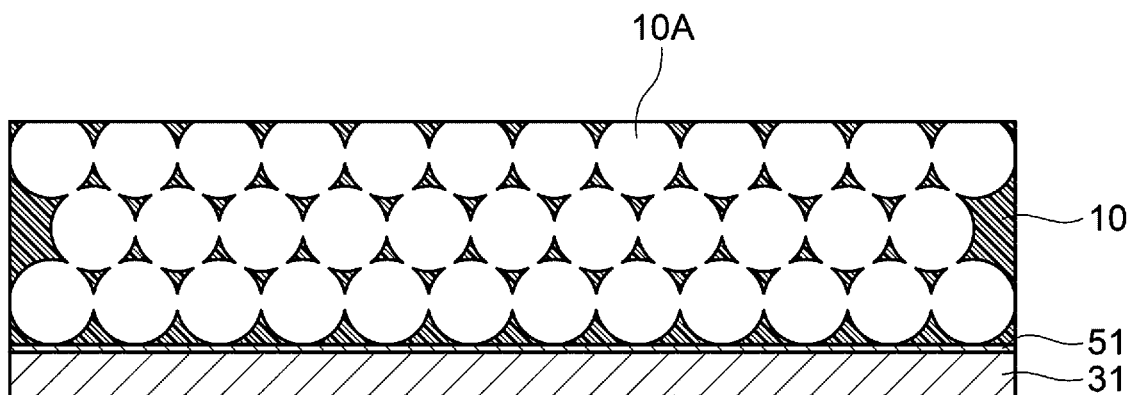
FIG. 1 is a schematic drawing showing an example of a form of a porous polyimide film according to an exemplary embodiment of the present disclosure.

An example of an all-solid-state battery according to an exemplary embodiment of the present disclosure is described below.

In the specification of the present disclosure, matters common to a first exemplary embodiment and a second exemplary embodiment are referred to as "matters according to an exemplary embodiment of the present disclosure".

An all-solid-state battery according to the first exemplary embodiment includes a positive electrode active material layer, a negative electrode active material layer, and a solid electrolyte layer containing a solid electrolyte and a porous polyimide film which holds the solid electrolyte. The porous polyimide film has a void ratio of 60% or more and 80% or less and a pore diameter of 0.1 μm or more and 10 μm or less.

An all-solid-state battery according to the second exemplary embodiment includes a positive electrode active material layer, a negative electrode active material layer, and a solid electrolyte layer containing a solid electrolyte and a porous polyimide film which holds the solid electrolyte. The porous polyimide film holds the solid electrolyte filled in pores at a filling rate of 55% or more.

The solid electrolyte layer provided in the all-solid-state battery uses, for example, a binder resin for holding the solid electrolyte. When the solid electrolyte layer uses the binder resin, a film is formed due to the binder resin on the surface of the solid electrolyte, thereby decreasing the conductivity of lithium ions. Thus, the battery capacity (hereinafter, may be referred to as "cycle characteristic") is decreased during repeated charge and discharge. Therefore, application of a porous film as the holding body of the solid electrolyte is investigated.

When, in forming the solid electrolyte layer, the solid electrolyte is held by the porous film, the pores of the pours film are filled with the solid electrolyte under pressure. The porous film used for holding the solid electrolyte is, for example, a porous polyolefin film. When the porous polyolefin film is used, the solid electrolyte filled in the pores of the porous olefin film has low filling performance because of the low strength of the porous polyolefin film. Also, the porous polyolefin film has irregular pore diameters and thus exhibits low filling performance even when filled with the solid electrolyte under pressure. Further, the low void ratio decreases the amount of the solid electrolyte which can be held. As a result, particles of the solid electrolyte in the solid electrolyte layer are hardly brought into contact with each other and thus variation easily occurs in conductivity of lithium ions. Therefore, a decrease in battery capacity easily occurs during repeated charge and discharge. In addition, a porous film having higher strength than the porous polyolefin film is, for example, a porous polyimide film. The porous polyimide film has higher strength than the porous polyolefin film and the higher filling performance of the solid electrolyte as compared with the case of application of the porous polyolefin film. However, even when the porous polyimide film is used, a decrease in battery capacity during repeated charge and discharge is desired to be suppressed.

On the other hand, the all-solid-state battery having the configuration described above according to the exemplary embodiment of the present disclosure suppresses a decrease in battery capacity when repeatedly charged and discharged.

In the all-solid-state battery according to the first exemplary embodiment, the porous polyimide film which holds the solid electrolyte has a void ratio of 60% or more and 80% or less and a pore diameter of 0.1 μm or more and 10 μm or less. With the void ratio and pore diameter within these respective ranges, the filling property of the solid electrolyte is enhanced. Therefore, the particles of the solid electrolyte filled in the pores are easily brought into contact with each other, thereby enhancing the uniformity of lithium ion conductivity. Thus, a decrease in battery capacity during repeated charge and discharge is considered to be suppressed.

In the all-solid-state battery according to the second exemplary embodiment, the filling rate of the solid electrolyte is 55% or more, and thus the particles of the solid electrolyte filled in the pores are easily brought into contact with each other, thereby enhancing the uniformity of lithium ion conductivity. Thus, a decrease in battery capacity during repeated charge and discharge is considered to be suppressed.

<All-Solid-State Battery>

The all-solid-state battery according to the exemplary embodiment of the present disclosure is described with reference to FIG. 2.

Figure 2:
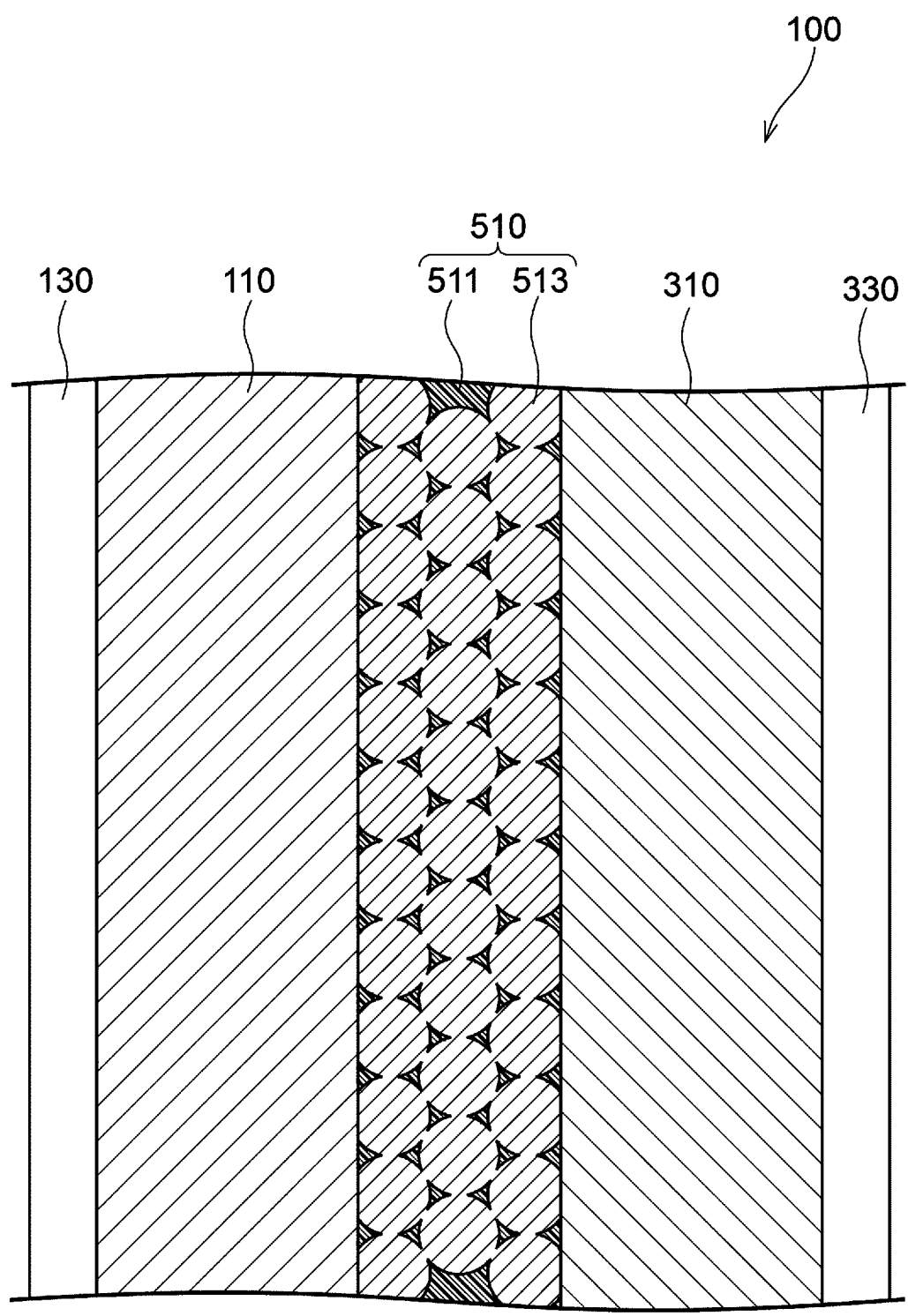
FIG. 2 is a schematic partial sectional view showing an example of an all-solid-state battery according to an exemplary embodiment of the present disclosure.

FIG. 2 is a partial schematic sectional view showing an example of the all-solid-state battery according to the exemplary embodiment of the present disclosure. As shown in FIG. 2, an all-solid-state battery 100 includes a positive electrode active material layer 110, a solid electrolyte layer 510, and a negative electrode active material 310, which are housed in an outer member not shown in the drawing. The positive electrode active material layer 110 contains a positive electrode active material, and the negative electrode active material layer 310 contains a negative electrode active material. The positive electrode active material layer 110 is provided on a positive electrode current collector 130, and the negative electrode active material layer 310 is provided on a negative electrode current collector 330. The solid electrolyte layer 510 is disposed between the positive electrode active material layer 110 and the negative electrode active material layer 310 so that the positive electrode active material layer 110 and the negative electrode active material layer 310 face each other. The solid electrolyte layer 510 includes a solid electrolyte 513 and a holding body 511 which holds the solid electrolyte 513, and the pores of the holding body 511 are filled with the solid electrolyte 513. A porous polyimide film is applied as the holding body 511 which holds the solid electrolyte 513. The positive electrode current collector 130 and the negative electrode current collector 330 are members provided according to demand. In addition, a positive electrode current collection tab and a negative electrode current collection tab (both not shown) may be provided at the ends of the positive electrode current collector 130 and the negative electrode current collector 330, respectively.

In the all-solid-state battery according to the first exemplary embodiment, a porous polyimide film having a void ratio of 60% or more and 80% or less and a pore diameter of 0.1 μm or more and 10 μm or less is applied as the holding body 511 provided in the solid electrolyte layer 510.

In the all-solid-state battery according to the second exemplary embodiment, a porous polyimide film is applied as the holding body 511 provided in the solid electrolyte layer 510. The porous polyimide film holds the solid electrolyte 513 filled in pores at a filling rate of 55% or more.

Although the all-solid-state battery according to the exemplary embodiment of the present disclosure is described above with reference to FIG. 2, the form of the all-solid-state battery according to the exemplary embodiment of the present disclosure is not limited to this. Various forms can be used within a range where the object of the present disclosure can be achieved.

Next, an example of a method for producing the all-solid-state battery according to the exemplary embodiment of the present disclosure is described.

First, a coating solution for forming the positive electrode active material layer 110 containing the positive electrode active material is applied and dried on the positive electrode current collector 130 to produce a positive electrode including the positive electrode active material layer 110 provided on the positive electrode current collector 130.

Similarly, a coating solution for forming the negative electrode active material layer 310 containing the negative electrode active material is applied and dried on the negative electrode current collector 330 to produce a negative electrode including the negative electrode active material layer 310 provided on the negative electrode current collector 330.

If required, each of the positive electrode and the negative electrode may be compressed.

Next, a coating solution for forming the solid electrolyte layer 510, which contains the solid electrolyte 513, is applied and dried on a substrate to form a layered solid electrolyte 513.

Next, a porous polyimide film serving as the holding body 511 and the layered solid electrolyte 513 are superposed as a material for forming the solid electrolyte layer 510 on the positive electrode active material layer 110 of the positive electrode. Further, the negative electrode is superposed on the material for forming the solid electrolyte layer 510 so that the negative electrode active material layer of the negative electrode faces the positive electrode active material layer side, forming a laminated structure. In the laminated structure, the positive electrode (the positive electrode current collector 130 and the positive electrode active material layer 110), the solid electrolyte layer 510, and the negative electrode (the negative electrode active material layer 310 and the negative electrode current collector 330) are laminated in that order.

Next, by compressing the laminated structure, the solid electrolyte 513 is impregnated into the pores of the porous polyimide film serving as the holding body 511, and the solid electrolyte 513 is held by the porous polyimide film.

Next, the laminated structure is housed in an outer member (not shown).

Thus, the all-solid-state battery 100 according to the exemplary embodiment of the present disclosure is produced.

The constituent elements of the all-solid-state battery according to the exemplary embodiment of the present disclosure are described below. In description below, reference numerals are omitted.

(Positive Electrode Current Collector and Negative Electrode Current Collector)

The positive electrode current collector and the negative electrode current collector are members provided according to demand. Materials used for the positive electrode current collector and the negative electrode current collector are not particularly limited as long as they are known conductive materials. Usable examples thereof include metals such as aluminum, copper, nickel, titanium, and the like.

(Positive Electrode Active Material Layer)

The positive electrode active material layer is a layer containing the positive electrode active material. If required, the positive electrode active material layer may contain known additives such as a conductive auxiliary agent, a binder resin, etc. The positive electrode active material is not particularly limited, and a known positive electrode active material can be used. Examples thereof include lithium-containing composite oxides ($LiCoO_2$, $LiNiO_2$, $LiMnO_2$, $LiMn_2O_4$, $LiFeMnO_4$, $LiV_2O_5$, and the lie), lithium-containing phosphate salts ($LiFePO_4$, $LiCoPO_4$, $LiMnPO_4$, $LiNiPO_4$, and the like), conductive polymers (polyacetylene, polyaniline, polypyrrole, polythiophene, and the like), and the like. The positive electrode active materials may be used alone or in combination of two or more.

(Negative Electrode Active Material Layer)

The negative electrode active material layer is a layer containing the negative electrode active material. If required, the negative electrode active material layer may contain known additives such as a binder resin etc. The negative electrode active material is not particularly limited, and a known negative electrode active material can be used. Examples thereof include carbon materials (graphite (natural graphite and artificial graphite), carbon nanotubes, graphitized carbon, low-temperature fired carbon, and the like), metals (aluminum, silicon, zirconium, titanium, and the like), metal oxides (tin dioxide, lithium titanate, and the like), and the like. The negative electrode active materials may be used alone or in combination of two or more.

(Solid Electrolyte Layer)

The solid electrolyte layer contains the solid electrolyte and the porous polyimide film serving as the holding body which holds the solid electrolyte.

[Solid Electrolyte]

The solid electrolyte is not particularly limited, and a known solid electrolyte can be used. Examples thereof include a polymer solid electrolyte, an oxide solid electrolyte, a sulfide solid electrolyte, a halide solid electrolyte, a nitride solid electrolyte, and the like.

Examples of the polymer solid electrolyte include, but are not limited to, fluorocarbon resins (homopolymers such as polyvinylidene fluoride, polyhexafluoropropylene, polytetrafluoroethylene, and the like, copolymers each having these as constituent units, and the like), polyethylene oxide resins, polyacrylonitrile resins, polyacrylate resins, and the like. The sulfide solid electrolyte is preferably contained in view of excellent lithium ion conductivity. In view of the same, the sulfide solid electrolyte containing, as a constituent element, at least one of sulfur, lithium, and phosphorus is preferably used.

The oxide solid electrolyte is not particularly limited and, for example, particles of a lithium-containing oxide solid electrolyte can be used. Examples thereof include $Li_2O$—$B_2O_3$—$P_2O_5$, $Li_2O$—$SiO_2$, and the like.

The sulfide solid electrolyte is not particularly limited, and the sulfide solid electrolyte containing, as a constituent element, at least one of sulfur, lithium, and phosphorus can be used. Examples thereof include $8Li_2O.67Li_2S.25P_2Ss$, $Li_2S$, $P_2Ss$, $Li_2S$—$SiS_2$, $LiI$—$Li_2S$—$SiS_2$, $LiI$—$Li_2S$—$P_2Ss$, $LiI$—$Li_3PO_4$—$P_2Ss$, $LiI$—$Li_2S$—$P_2O_5$, $LiI$—$Li_2S$—$B_2S_3$, and the like.

Examples of the halide solid electrolyte include, but are not limited to, LiI and the like.

Examples of the nitride solid electrolyte include, but are not limited to, $Li_3N$ and the like.

Among these, the solid electrolyte preferably contains the sulfide solid electrolyte and is more preferably the sulfide solid electrolyte. The sulfide solid electrolyte is preferably a solid electrolyte containing, as a constituent element, at least one of sulfur, lithium, and phosphorus.

[Porous Polyimide Film]

The all-solid-state battery according to the first exemplary embodiment uses a porous polyimide film having a void ratio of 60% or more and 80% or less and a pore diameter of 0.1 μm or more and 10 μm or less.

The all-solid-state battery according to the second exemplary embodiment uses a porous polyimide film holding the solid electrolyte filled in pores at a filling rate of 55% or more.

In the exemplary embodiment of the present disclosure, the term "film" represents the concept including not only those generally called "film" but also those generally called "film" and "sheet".

(Void Ratio)

The porous polyimide film applied to the all-solid-state battery according to the first exemplary embodiment has a void ratio of 60% or more and 80% or less. The void ratio within the range causes the excellent cycle characteristics. The lower limit of the void ratio may be 63% or more or 65% or more. The upper limit of the void ratio may be 78% or less or 77% or less.

The void ratio is a value determined from the apparent density and true density of the porous polyimide film. The apparent density is a value obtained by dividing the mass (g) of the porous polyimide film by the total volume ($cm^3$) of the porous polyimide film containing pores. The true density ρ is a value obtained by dividing the mass (g) of the porous polyimide film by the volume ($cm^3$) of the porous polyimide film excluding pores. The void ratio of the porous polyimide film is calculated by the following formula.

$$\text{Void ratio (\%)} = \{1-(d/\rho)\}\times 100 = [1-\{(w/t)/\rho)\}]\times 100 \quad \text{(Formula)}$$

d: apparent density of porous polyimide film ($g/cm^3$)
ρ: true density of porous polyimide film ($g/cm^3$)
w: weight of porous polyimide film ($g/m^2$)
t: thickness of porous polyimide film (μm)

The pore diameter (average value of pore diameters) falls in a range of 0.1 μm or more and 10 μm or less. The pore diameter is a value represented as an average value. The pore diameter of 0.10 μm or more causes the excellent cycle characteristics. Also, the pore diameter of 10 μm or less suppresses a decrease in battery characteristics, such as short circuit and the like. In view of more excellent cycle characteristics, the pore diameter may be 0.2 μm or more, 0.3 μm or more, 0.4 μm or more, or 0.5 μm or more. In view of suppressing a decrease in battery characteristics, such as short circuit or the like, the pore diameter may be 7 μm or less, preferably in a range of 5 μm or less, and may be 3 μm or less or 2 μm or less. The pore diameter is measured by observation using a scanning electron microscope (SEM) as described later.

In view of excellent cycle characteristics, the porous polyimide film applied to the all-solid-state battery according to the first exemplary embodiment preferably has a void ratio of 63% or more and 80% or less and a pore diameter of 0.3 µm or more and 7 µm or less, more preferably has a void ratio of 65% or more and 78% or less and a pore diameter of 0.4 µm or more and 5 µm or less, and still more preferably has a void ratio of 65% or more and 77% or less and a pore diameter of 0.5 µm or more and 3 µm or less.

The porous polyimide film having a void ratio of 60% or more and 80% or less and a pore diameter of 0.1 µm or more and 10 µm or less is preferred from the viewpoint that the solid electrolyte can be easily filled in the pores at a filling rate of 55% or more.

The porous polyimide film applied to the all-solid-state battery according to the second exemplary embodiment holds the solid electrolyte filled in the pores at a filling rate of 55% or more. The solid electrolyte filled in the pores at a filling rate within the range causes the excellent cycle characteristics. The solid electrolyte filled in the pores of the porous polyimide film preferably has a higher filling rate, which may be 60% or more, 70% or more, 80% or more, or 85% or more.

The filling rate of the solid electrolyte filled in the pores is determined by the density ratio between before and after impregnation of the solid electrolyte, specifically as follows. First, the apparent density of the porous polyimide film before filling the solid electrolyte is determined. Next, the density of the porous polyimide film is determined after the pores of the porous polyimide film is impregnated with the solid electrolyte by applying pressure. Then, the filling rate of the solid electrolyte layer is calculated by the following formula.

Filling rate (%)=(density after filling the solid electrolyte/density before filling the solid electrolyte)×100 (Formula)

The filling rate of the solid electrolyte filled in the pores of the porous polyimide film can be easily controlled to 55% or more by, for example, using a porous polyimide film having a void ratio of 60% or more and 80% or less and a pore diameter of 0.1 µm or more and 10 µm or less.

In the all-solid-state battery according to the exemplary embodiment of the present disclosure, the shape of pores in the porous polyimide film is preferably a spherical shape (shape near to a spherical shape). The term "spherical shape" of pores includes both a spherical shape and a substantially spherical shape (shape close to a spherical shape). Specifically, the spherical shape represents that pores having a ratio (long diameter/short diameter) of long diameter to short diameter of 1 or more and less than 1.5 are present at a ratio exceeding 80%. The ratio of pores having a ratio (long diameter/short diameter) of long diameter to short diameter of 1 or more and less than 1.5 is preferably 85% or more and more preferably 90% or more. That is, the porous polyimide film preferably has spherical pores which include pores having a ratio (long diameter/short diameter) of long diameter to short diameter of 1.5 or more at a ratio of 20% or less. The ratio of pores having a ratio (long diameter/short diameter) of long diameter to short diameter of over 1.5 is more preferably 15% or less and still more preferably 10% or less. The closer to 1 the ratio of long diameter to short diameter is, the closer to a true spherical shape the shape is.

The pores are preferably connected to each other (refer to FIG. 1). The pore diameter of a portion where the pores are connected to each other is, for example, ¹⁄₁₀₀ or more and ½ or less, preferably ¹⁄₅₀ or more and ⅓ or less, and more preferably ¹⁄₂₀ or more and ¼ or less, of the maximum diameter of the pores. Specifically, the average value of the pore diameters of the portions where the pores are connected to each other is 5 nm or more and 1500 nm or less.

The ratio (ratio of maximum diameter to minimum diameter of pores) of the pores is not particularly limited and is, for example, 1 or more and 2 or less. The ratio is preferably 1 or more and 1.9 or less and more preferably 1 or more and 1.8 or less. Within the range, the ratio is more preferably closer to 1. The "ratio of maximum diameter to minimum diameter of pores" is the ratio represented by a value (that is, maximum diameter/minimum diameter of pores) obtained by dividing the maximum diameter by the minimum diameter of the pores.

The circularity of pores is not particularly limited and is, for example, 0.85 or more, preferably 0.9 or more, more preferably 0.92 or more, and still more preferably 0.95 or more.

The circularly of pores is defined by the formula: circularity=$(4\pi A)0.5/L$ wherein A is the opening area of the pore to be determined, and L is the outline length of the pore. A perfect circle has a circularity of 1, and the circularity decreases as the peripheral length L increases relative to the sectional area A.

The pore diameter (average value of pore diameters), the average value of pore diameters of portions where the pores are connected to each other, the ratio of maximum diameter to minimum diameter of the pores, and the circularity of the pores are values measured by observation using a scanning electron microscope (SEM). Specifically, first, the porous polyimide film is cut to prepare a measurement sample. The measurement sample is observed and measured by VE SEM manufactured by KEYENCE Corporation using an image processing software provided as standard equipment. The average value of pore diameters (arithmetic average diameter) and the minimum and maximum diameters of the pores are determined by observing and measuring 100 pores in a section of the measurement sample. Also, with respect to the pore diameters of portions where the pores are connected to each other, the average value of pore diameters (arithmetic average diameter) of portions where the pores are connected to each other is determined for 100 pores. When the shape (shape of the pores in a measurement section) of the pores is not a circular shape, the longest portion is considered as the diameter. The circularity of the pores is calculated based of the definition described above using the average value (arithmetic average peripheral length) of peripheral lengths measured for 100 pores.

The ratio of maximum diameter to minimum diameter of the pores and the circularity of the pores within the respective ranges described above are preferred from the viewpoint of suppressing variation in the pore diameter. Also, variation is suppressed in the conductivity of lithium ions passing through the porous polyimide film according to the exemplary embodiment of the present disclosure, thereby easily producing an all-solid-state battery having excellent cycle characteristics.

The thickness (average value) of the porous polyimide film is not particularly limited and may be, for example, 10 µm or more and 1000 m or less. The thickness may be 15 µm or more or 20 µm or more. Also, the thickness may be 500 µm or less, 400 µm or less, or 300 µm or less.

The all-solid-state battery according to the exemplary embodiment of the present disclosure may include a solid electrolyte layer containing a solid electrolyte and a porous polyimide film holding the solid electrolyte filled in pores. In the solid electrolyte layer, the ratio (thickness of porous polyimide film/total thickness of solid electrolyte layer) of the thickness of the porous polyimide film, which holds the solid electrolyte, to the total thickness of the solid electrolyte layer is 0.5 or more. With the ratio (thickness of porous polyimide film/total thickness of solid electrolyte layer) of 0.5 or more, the solid electrolyte is easily held by the porous polyimide film. The ratio may be 0.6 or more, 0.7 or more, 0.8 or more, or 0.9 or more. The ratio (thickness of porous polyimide film/total thickness of solid electrolyte layer) may be 1.0. That is, the thickness of the porous polyimide film in the solid electrolyte layer may be the same as the thickness of the solid electrolyte layer.

In determining the ratio (thickness of porous polyimide film/total thickness of solid electrolyte layer), a sample containing the solid electrolyte layer is obtained from the all-solid-state battery to be measured. Next, the collected sample is embedded in an exposure resin, which is then cured. The resultant cured product is sliced by using a microtome provided with a diamond blade to prepare an observation sample in which a section of the measurement sample is exposed. A SEM image of the section is observed with a scanning electron microscope (SEM) at a magnification at which the total thickness of the solid electrolyte layer can be observed. Then, the ratio of the thickness of the porous polyimide film to the total thickness of the solid electrolyte layer is calculated.

(Method for Producing Porous Polyimide Film)

A desired example of a method for producing the porous polyimide film applied to the all-solid-state battery according to the exemplary embodiment of the present disclosure is described below.

The porous polyimide film according to the exemplary embodiment of the present disclosure is produced, for examples, as follows.

A first process of applying a polyimide precursor solution containing particles and a polyimide precursor to form a coating film, and then drying the coating film to form a film containing the polyimide precursor and the resin particles.

A second process of imidizing the polyimide precursor by heating the resultant film to form a polyimide film, the second process including treatment of removing the particles.

In the description of the production method, the same constituent parts shown in FIG. 1 referred to are denoted by the same reference numeral. In FIG. 1, reference numeral 31 denotes a substrate, reference numeral 51 denotes a release layer, reference numeral 10A denotes a pore, and reference numeral 10 denotes a porous polyimide film.

(First Process)

In the first process, a polyimide precursor solution (particle-dispersed polyimide precursor solution) containing particles and a polyimide precursor is prepared. Next, the particle-dispersed polyimide precursor solution is applied on a substrate to form a coating film containing the polyimide precursor solution and the particles. Then, the coating film formed on the substrate is dried to form a film containing the polyimide precursor and the particles.

The substrate on which the particle-dispersed polyimide precursor solution is applied is not particularly limited. Examples thereof include resin-made substrates of polystyrene, polyethylene terephthalate, and the like; glass substrates; ceramic substrates; metal substrates of iron, stainless steel (SUS), and the like; composite material substrates of combination of these materials; and the like. If required, a release layer may be provided on the substrate by, for example, release treatment with a silicone-based or fluorine-based release agent or the like.

A method for applying the particle-dispersed polyimide precursor solution on the substrate is not particularly limited. Examples thereof include various methods such as a spray coating method, a spin coating method, a roll coating method, a bar coating method, a slit die coating method, an ink jet coating method, and the like.

The amount of the polyimide precursor solution applied for forming the coating film containing the polyimide precursor solution and the particles may be set to an amount with which a predetermined film thickness can be obtained.

After the coating film containing the polyimide precursor solution and the particles is formed, the coating film is dried to form a film containing the polyimide precursor and the particles. Specifically, the coating film containing the polyimide precursor solution and the particles is dried by, for example, a method of heat-drying, natural drying, vacuum drying, or the like to form the film. More specifically, the film is formed by drying the coating film so that the solvent remaining in the film is 50% or less, preferably 30% or less, relative to the solid content of the film.

(Second Process)

In the second process, the polyimide precursor is imidized by heating the film formed in the first process and containing the polyimide precursor and the particles described above to form a polyimide film. This process includes treatment of removing the particles. A porous polyimide film is formed through the treatment of removing the particles.

In the second process, in forming the polyimide film, specifically, imidization is allowed to proceed by heating the film formed in the first process and containing the polyimide precursor and the particles, and imidization is allowed to proceed by further heating to form the polyimide film. As imidization proceeds to increase the imidization rate, dissolution in an organic solvent becomes difficult.

In the second process, the treatment of removing the particles is performed. The particles may be removed in the process of imidizing the polyimide precursor by heating the film or removed from the polyimide film after (after imidization) the completion of imidization.

In the exemplary embodiment of the present disclosure, the process of imidizing the polyimide precursor represents the process of allowing imidization to proceed by heating the film, formed in the first process and containing the polyimide precursor and the particles, to create a state before the polyimide film is formed after the completion of imidization.

In view of particle removability or the like, the treatment of removing the particles is preferably performed when the imidization rate of the polyimide precursor in the polyimide film is 10% or more during the process of imidizing the polyimide precursor. With the imidization rate of 10% or more, the form is easily maintained.

Next, the treatment of removing the particles is described.

First, the treatment of removing resin particles is described.

Examples of the treatment of removing resin particles include a method of removing the resin particles by heating, a method of removing with an organic solvent which dissolves the resin particles, a method of removing by decomposition of the resin particles with a laser or the like, and the like. Among these, preferred are the method of removing the resin particles by heating and a method of removing by using an organic solvent which dissolves the resin particles.

In the method of removing by heating, the resin particles may be removed by, for example, decomposition by heating for allowing imidization to proceed during the process of imidizing the polyimide precursor. In this case, in view of no operation of removing the resin particles with a solvent, this method is useful for reducing the operations.

The method of removing with an organic solvent which dissolves the resin particles is, for example, a method of removing the resin particles by contact (for example, immersion in the solvent) with the organic solvent which dissolves the resin particles. In this case, immersion in the solvent is desirable in view of increasing the dissolution efficiency of the resin particles.

The organic solvent which dissolves the resin particles and used for removing the resin particles is not particularly limited as long as the organic solvent can dissolve the resin particles but does not dissolve the polyimide film before the completion of imidization and the polyimide film after the completion of imidization. Examples thereof include ethers such as tetrahydrofuran (THF) and the like, aromatics such as toluene and the like; ketones such as acetone and the like; esters such as ethyl acetate and the like; and the like.

When the resin particles are removed by dissolution to form the porous film, dissolution in a general-purpose solvent such as tetrahydrofuran, acetone, toluene, ethyl acetate, or the like is preferred. In addition, water can also be used according to the resin particles and polyimide precursor used.

When the resin particles are removed by heating to form the porous film, thermal decomposition is performed at a temperature at which the polyimide precursor film is imidized without decomposition at the drying temperature after coating. From this viewpoint, the start temperature of thermal decomposition of the resin particles is 150° C. or more and 320° C. or less, preferably 180° C. or more and 300° C. or less, and more preferably 200° C. or more and 280° C. or less.

Next, the treatment of removing inorganic particles is described.

The treatment of removing the inorganic particles uses, for example, a method of removing by using a liquid (hereinafter, referred to as a "particle removing liquid") which dissolves the inorganic particles but does not dissolve the polyimide precursor or polyimide. The particle removing liquid is selected according to the inorganic particles used. Examples thereof include aqueous solutions of acids such as hydrofluoric acid, hydrochloric acid, hydrobromic acid, boric acid, perchloric acid, phosphoric acid, sulfuric acid, nitric acid, acetic acid, trifluoroacetic acid, citric acid, and the like; aqueous solutions of bases such as sodium hydroxide, potassium hydroxide, tetramethylammonium hydroxide, sodium carbonate, potassium carbonate, ammonia, the organic amines described above; and the like. Also, water can be used alone according to the inorganic particles and polyimide precursor used.

In the second process, a heating method for allowing imidization to proceed by heating the film, formed in the first process, to form the polyimide film is not particularly limited. For example, a method of heating in two stages can be used. In the case of two-stage heating, specific heating conditions are as follows.

A desired heating condition of the first stage is a temperature at which the shape of the particles can be maintained. Specifically, the temperature is, for example, within a range of 50° C. or more and 150° C. or less and preferably within a range of 60° C. or more and 140° C. or less. In addition, a heating time is preferably within a range of 10 minutes or more and 60 minutes or less. The higher the heating temperature, the shorter the heating time may be.

Heating conditions of the second stage are, for example, heating conditions of 150° C. or more and 450° C. or less (preferably 200° C. or more and 430° C. or less) and 20 minutes or more and 120 minutes or less. Under these heating conditions within the respective ranges, imidization reaction further proceeds, and the polyimide film can be formed. In the heating reaction, heating may be performed by increasing the temperature stepwisely or gradually at a constant rate before the temperature reaches the final heating temperature.

The heating conditions are not limited to the conditions of the two-stage heating method, and a method of heating in one stage may be used. In the case of the one-stage heating method, imidization may be completed under only the heating conditions of the second stage described above.

In view of increasing an opening ratio, the particles are preferably exposed by treatment of exposing the particles in the second process. The treatment of exposing the particles in the second process is preferably performed during the process of imidizing the polyimide precursor or after imidization and before the treatment of removing the particles.

In this case, for example, when the film is formed on the substrate by using the particle-dispersed polyimide precursor solution, the particle-dispersed polyimide precursor solution is applied on the substrate to form a coating film in which the particles are embedded. Next, the coating film is dried to form the film containing the polyimide precursor and the particles. The film formed by this method is in a state where the particles are embedded. Before removal of the particles, the film may be subjected to the treatment of exposing the particles from the polyimide film during the process of imidizing the polyimide precursor by heating or after the completion of imidization (after imidization).

In the second process, the treatment of exposing the particles is performed, for example, when the polyimide film has the following state.

In the case of treatment of exposing the particles when the imidization rate of the polyimide precursor in the polyimide film is less than 10% (that is, in the state where the polyimide film can be dissolved in the solvent), examples of the treatment of exposing the particles embedded in the polyimide film include a treatment of wiping, a treatment of immersion in a solvent, and the like. The solvent used may be the same as or different from the solvent used for the particle-dispersed polyimide precursor solution of the exemplary embodiment of the present disclosure.

In the treatment of exposing the particles when the imidization rate of the polyimide precursor in the polyimide film is 10% or more (that is, in a state insoluble in water and the organic solvent) and when the polyimide film is completely imidized, a method of exposing the particles by mechanically cutting with a tool such as sandpaper or the like can be used. In the case of resin particles, for example, a method of exposing the resin particles by decomposition with a laser or the like can be used.

For example, in the case of mechanical cutting, upper regions (that is, regions of the particles on the side apart from the substrate) of the particles embedded in the polyimide film are partially cut together with the polyimide film present in the upper portions of the particles, and the cut particles are exposed from the surface of the polyimide film.

Then, the particles are removed, by the particle removing treatment described above, from the polyimide film in which the particles are exposed. Thus, the porous polyimide film from which the particles have been removed can be formed (refer to FIG. 1).

The production of the porous polyimide film subjected to the treatment of exposing the particles in the second process is described above, but the treatment of exposing the particles may be performed in the first process in view of enhancing an opening ratio. In this case, in the first process of forming the coating film and then drying the coating film to form the film, the particles may be exposed by the treatment of exposing the particles. The opening ratio of the porous polyimide film is enhanced by the treatment of exposing the particles.

For example, in the process of forming the coating film containing the polyimide precursor solution and the particles and then drying the coating film to form the film containing the polyimide precursor and the particles, as described above, the polyimide precursor in the film is in a state soluble in the solvent. In this state, the particles in the film can be exposed by, for example, the treatment of wiping or immersion in a solvent, or the like. Specifically, the polyimide precursor solution present in a region thicker than the thickness of a particle layer is removed by, for example, the treatment of exposing the particle layer by wiping with a solvent. Thus, the particles present in a region (region of the particle layer on the side apart from the substrate) above the particle layer are exposed from the surface of the film.

In the second process, the substrate used for forming the film in the first process may be separated when the dry film is formed, may be separated when the polyimide precursor in the polyimide film is in a state insoluble in the organic solvent, or may be separated when the film is formed after the completion of imidization.

The porous polyimide film is produced through the processes described above. The porous polyimide film may be post-processed.

Herein, the imidization rate of the polyimide precursor is described.

Examples of a partially imidized polyimide precursor include precursors having structures each having a repeating unit represented by any one of a general formula (V-1), general formula (V-2), and general formula (V-3) below.

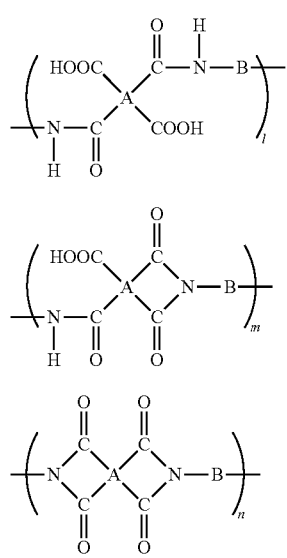

In the general formula (V-1), the general formula (V-2), and the general formula (V-3), A and B represent the same meanings as A and B, respectively, in a formula (I). l represents an integer of 1 or more, and m and n each independently represent 0 or an integer of 1 or more.

The imidization rate of the polyimide precursor represents the ratio of the number (2n+m) of imide ring-opened bond parts to the total number of bond parts (2l+2m+2n) in bond parts (reaction parts between tetracarboxylic dianhydride and diamine compound) of the polyimide precursor. That is, the imidization rate of the polyimide precursor is represented by "(2n+m)/(2l+2m+2n)".

The imidization rate of the polyimide precursor (value of "(2n+m)/(2l+2m+2n)") is measured by the following method.

—Measurement of Imidization Rate of Polyimide Precursor—

Formation of Polyimide Precursor Sample (i) A polyimide precursor composition to be measured is applied in a thickness within a range of 1 μm or more and 10 μm or less on a silicone wafer to form a coating film sample.

(ii) The solvent in the coating film sample is substituted by tetrahydrofuran (THF) by immersing the coating film sample in tetrahydrofuran (THF) for 20 minutes. The solvent for immersion is not limited to THF and can be selected from solvents which do not dissolve the polyimide precursor but are miscible with the solvent component contained in the polyimide precursor composition. Usable examples thereof include alcohol solvents such as methanol, ethanol, and the like, and ether compounds such as dioxane and the like.

(iii) The coating film sample is taken out from THF, and THF adhering to the surface of the coating film sample is removed by spraying $N_2$ gas. Then, the coating film sample is dried by treatment for 12 hours or more under a reduced pressure of 10 mmHg or less within a range of 5° C. or more and 25° C. or less, forming a polyimide precursor sample.

Formation of 100% Imidized Standard Sample (iv) Similarly to the above (i), the polyimide precursor composition to be measured is applied on a silicone wafer to form a coating film sample.

(v) Imidization reaction is performed by heating the coating film sample at 380° C. for 60 minutes to form a 100% imidized standard sample.

Measurement and Analysis (vi) An infrared absorption spectrum of each of the 100% imidized standard sample and the polyimide precursor sample is measured by using a Fourier transform infrared spectrophotometer (manufactured by Horiba Ltd. FT-730). In the 100% imidized standard sample, the ratio I'(100) of the absorption peak (Ab'(1780 cm$^{-1}$)) due to an imide bond near 1780 cm$^{-1}$ to the absorption peak (Ab'(1500 cm$^{-1}$) due to an aromatic ring near 1500 cm$^{-1}$ is determined.

(vii) Similarly, in measurement of the polyimide precursor sample, the ratio I(x) of the absorption peak (Ab (1780 cm$^{-1}$)) due to an imide bond near 1780 cm$^{-1}$ to the absorption peak (Ab (1500 cm$^{-1}$) due to an aromatic ring near 1500 cm$^{-1}$ is determined.

By using the measured absorption peaks I'(100) and I(x), the imidization rate of the polyimide precursor is calculated based on the following formulae.

Imidization rate of polyimide precursor=$I(x)/I'(100)$     Formula:

$I'(100)=(Ab'(1780$ cm$^{-1}))/(Ab'(1500$ cm$^{-1}))$     Formula:

$I(x)=(Ab(1780$ cm$^{-1}))/(Ab(1500$ cm$^{-1}))$     Formula:

The measurement of the imidization rate of the polyimide precursor is applied to measurement of the imidization rate of an aromatic polyimide precursor. In measurement of the imidization rate of an aliphatic polyimide precursor, a peak due to a structure not changed before and after imidization reaction is used as an internal standard peak in place of the aromatic ring absorption peak.

Next, each of the components in the particle-dispersed polyimide precursor for producing the porous polyimide film is described.

(Polyimide Precursor)

The polyimide precursor can be produced by polymerizing tetracarboxylic dianhydride with a diamine compound. Specifically, the polyimide precursor is a resin (polyamic acid) having a repeating unit represented by the general formula (I).

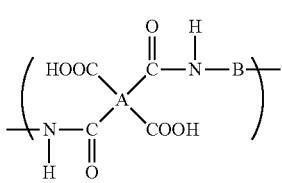

(I)

(In the formula (I), A represents a tetravalent organic group, and B represents a divalent organic group.)

In the general formula (I), a tetravalent organic group represented by A is a residue after removal of the four carboxyl groups from tetracarboxylic dianhydride used as a raw material.

On the other hand, a divalent organic group represented by B is a residue after removal of two amino groups from the diamine compound used as a raw material.

That is, the polyimide precursor having a repeating unit represented by the general formula (I) is a polymer of the tetracarboxylic dianhydride and the diamine compound.

The tetracarboxylic dianhydride may be either an aromatic or aliphatic compound, but an aromatic compound is preferred. That is, in the general formula (I), the tetravalent organic group represented by A is preferably an aromatic organic group.

Examples of the aromatic tetracarboxylic dianhydride include pyromellitic dianhydride, 3,3',4,4'-benzophenonetetracarboxylic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenylether tetracarboxylic dianhydride, 3,3',4,4'-dimethyldiphenylsilane tetracarboxylic dianhydride, 3,3',4,4'-tetraphenylsilane tetracarboxylic dianhydride, 1,2,3,4-furantetracarboxylic dianhydride, 4,4'-bis(3,4-dicarboyphenoxy)diphenyl sulfide dianhydride, 4,4'-bis(3,4-dicarboxylphenoxy)diphenylsulfone dianhydride, 4,4'-bis(3,4-dicarboxylphenoxy)diphenylpropane dianhydride, 3,3',4,4'-perfluoroisopropylidene diphthalic dianhydride, 3,3',4,4'-biphenyltetracarboxylic dianhydride, 2,3,3',4'-biphenyltetracarboxylic dianhydride, bis(phthalic acid) phenylphosphine oxide dianhydride, p-phenylene-bis (triphenylphthalic acid) dianhydride, m-phenylene-bis (triphenylphthalic acid) dianhydride, bis(triphenylphthalic acid)-4,4'-diphenyl ether dianhydride, bis(triphenylphthalic acid)-4,4'-diphenylmethane dianhydride, and the like.

Examples of the aliphatic tetracarboxylic dianhydride include aliphatic or alicyclic tetracarboxylic dianhydrides such as butanetetracarboxylic dianhydride, 1,2,3,4-cyclobutanetetracarboxylic dianhydride, 13-dimethyl-1,2,3,4-cyclobutanetetracarboxylic dianhydride, 1,2,3,4-cyclopentanetetracarboxylic dianhydride, 2,3,5-tricarboxycyclopentylacetic dianhydride, 3,5,6-tricarboxynorbonane-2-actic dianhydride, 2,3,4,5-tetrahydrofurantetracarboxylic dianhydride, 5-(2,5-dioxotetahydrofuryl)-3-methyl-3-cyclohexene-1,2-dicarboxylic dianhydride, bicyclo[2,2,2]-oct-7-ene-2,3,5,6-tetracarboxylic dianhydride, and the like; aliphatic tetracarboxylic dianhydrides each having an aromatic ring, such as 1,3,3a,4,5,9b-hexahydro-2,5-dioxo-3-furanyl)-naphtho[1,2-c]furan-1,3-dione, 1,3,3a,4,5,9b-hexahydro-5-methyl-5-(tetrahydro-2,5-dioxo-3-furanyl)-naphto[1,2-c]furan-1,3-dione, 1,3,3a,4,5,9b-hexahydro-8-methyl-5-(tetrahydro-2,5-dioxo-3-furanyl)-naphtho[1,2-c]furan-1,3-dione, and the like; and the like.

Among these, an aromatic tetracarboxylic dianhydride is preferred as the tetracarboxylic dianhydride, and, specifically, for example, pyromellitic dianhydride, 3,3',4,4'-biphenyltetracarboxyli dianhydride, 2,3,3',4'-biphenyltetracarboxylic dianhydride, 3,3',4,4'-biphenylether tetracarboxylic dianhydride, and 3,3',4,4'-benzophenone tetracarboxylic dianhydride are preferred, pyromellitic dianhydride, 3,3',4,4'-biphenyltetracarboxylic dianhydride, 3,3',4,4'-benzophenone tetracarboxylic dianhydride are more preferred, and 3,3',4,4'-biphenyltetracarboxylic dianhydride is particularly preferred.

These tetracarboxylic dianhydrides may be used alone or in combination of two or more.

In the use of combination of two or more types, aromatic tetracarboxylic dianhydrides or aliphatic tetracarboxylic dianhydrides may be used in combination, or an aromatic tetracarboxylic dianhydride and an aliphatic tetracarboxylic dianhydrides may be used in combination.

On the other hand, the diamine compound has two amino groups in its molecular structure. The diamine compound may be either an aromatic or aliphatic compound, but an aromatic compound is preferred. That is, in the general formula (I), the divalent organic group represented by B is preferably an aromatic organic group.

Examples of the diamine compound include aromatic diamines such as p-phenylenediamine, m-phenylenediamine, 4,4'-diaminodiphenylmethane, 4,4'-diaminodiphenylethane, 4,4'-diaminodiphenyl ether, 4,4'-diaminodiphenyl sulfide, 4,4'-diaminodiphenyl sulfone, 1,5-diaminonaphthalene, 3,3-dimethyl-4,4'-diaminobiphenyl, 5-amino-1-(4'-aminophenyl)-1,3,3-trimethylindane, 6-amino-1-(4'-aminophenyl)-1,3,3-trimethylindane, 4,4'-diaminobenzanilide, 3,5-diamino-3'-trifluoromethylbenzanilide, 3,5-diamino-4'-trifluoromethylbenzanilide, 3,4'-diaminodiphenyl ether, 2,7-diaminofluorene, 2,2-bis(4-aminophenyl)hexafluoropropane, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl) biphenyl, 2,2-bis[4-(4-aminophenoxy)phenyl]propane, 2,2-bis[4-(4-aminophenoxy)phenyl]hexafluoropropane, 1,4-bis (4-aminophenoxy)benzene, 4,4'-bis(4-aminophenoxy)-biphenyl, 1,3'-bis(4-aminophenoxy)benzene, 9,9-bis(4-aminophenyl)fluorene, 4,4'-(p-phenyleneisopropylidene) bisaniline, 4,4'-(m-phenyleneisopropylidene)bisaniline, 2,2'-bis[4-(4-amino-2-trifluoromethylphenoxy)phenyl] hexafluoropropane, 4,4'-bis[4-(4-amino-2-trifluoromethyl) phenoxy]-octafluorobiphenyl, and the like; aromatic diamines such as diaminotetrafluorothiophene and the like, each having two amino groups bonded to an aromatic ring and a heteroatom other than the nitrogen atoms of the amino groups; aliphatic diamines and alicyclic diamines such as 1,1-meta-xylylenediamine, 1,3-propanediamine, tetramethylenediamine, pentamethylenediamine, octamethylenediamine, nonamethylenediamine, 4,4-diaminoheptamethylenediamine, 1,4-diaminocyclohexane, isophoronediamine, tetrahydro dicyclopentadienylene diamine, hexahydro-4,7-metanoindanylene dimethylene diamine, tricyclo[6,2,1,0²·⁷]-undecylene dimethyldiamine, 4,4'-methylene bis(cyclohexylamine), and the like; and the like.

Among these, the diamine compound is preferably an aromatic diamine compound, and specifically, for example, p-phenylenediamine, m-phenylenediamine, 4,4'-diaminodiphenylmethane, 4,4'-diaminodiphenyl ether, 3,4'-diaminodiphenyl ether, 4,4'-diaminodiphenyl sulfide, and 4,4'-diaminodiphenyl sulfone are preferred, and 4,4'-diaminodiphenyl ether and p-phenylenediamine are particularly preferred.

These diamine compounds may be used alone or in combination of two or more. In the use of combination of two or more aromatic diamine compounds or aliphatic diamine compounds may be used in combination, or an aromatic diamine compound and an aliphatic diamine compound may be used in combination.

The number-average molecular weight of the polyimide precursor is preferably 1,000 or more and 150,000 or less, more preferably 5,000 or more and 130,000 or less, and still more preferably 10,000 or more and 100,000 or less.

With the polyimide precursor having a number-average molecular weight within the range, a decrease in solubility of the polyimide precursor in a solvent is suppressed, thereby easily securing film formability.

The number-average molecular weight of the polyimide precursor is measured by gel permeation chromatography (GPC) under measurement conditions described below.

Column: Tosoh TSK gel α-M (7.8 mm I. D×30 cm)
Eluent: DMF (dimethylformamide)/30 mM LiBr/60 mM phosphoric acid
Flow rate: 0.6 mL/min
Injection amount: 60 μL
Detector: RI (differential refractive index detector)

The content (concentration) of the polyimide precursor relative to the whole of the polyimide precursor solution is 0.1% by mass or more and 40% by mass or less, preferably 0.5% by mass or more and 25% by mass or less, and more preferably 1% by mass or more and 20% by mass or less.
(Particle)

The material of the particles is not particularly limited as long as the particles are in a state of being dispersed without being dissolved in the particle-dispersed polyimide precursor solution according to the exemplary embodiment of the present disclosure, further when the porous polyimide film is formed, the particles can be removed by a particle removing treatment described below. The particles are roughly classified into the resin particles and inorganic particles described below.

In the specification of the present disclosure, the expression "particles are not dissolved" includes dissolution within a range of 3% by mass or less in addition to non-dissolution of the particles in a liquid as an object at 25° C.

The volume-average particle diameter $D50v$ of the particles is not particularly limited. The volume-average particle diameter $D50v$ of the particles is, for example, preferably 0.1 μm or more and 10 μm or less. The volume-average particle diameter of the particles may be 0.2 μm or more, 0.3 μm or more, 0.4 μm or more, or 0.5 μm or more. Also, the volume-average particle diameter of the particles may be 7 μm or less, 5 μm or less, 3 μm or less, or 2 μm or less. The volume particle size distribution index (GSDv) of the particles is preferably 1.30 or less, more preferably 1.25 or less, and most preferably 1.20 or less. The volume particle size distribution index of the particles is calculated as $(D84v/D16v)^{1/2}$ from the particle size distribution of the particles in the particle-dispersed polyimide precursor solution.

The particle size distribution of the particles in the particle-dispersed polyimide precursor solution according to the exemplary embodiment of the present disclosure is measured as follows. The solution to be measured is diluted, and the particle size distribution of the particles in the solution is measured by using a Coulter counter LS13 (manufactured by Beckman Coulter, Inc.). Based on the measured particle size distribution, the particle size distribution is measured by drawing a volume cumulative distribution vs. divided particle diameter ranges (channels) from the small particle diameter side.

In the volume cumulative distribution drawn from the small particle diameter side, the particle diameter at 16% cumulation is regarded as the volume particle diameter $D16v$, the particle diameter at 50% cumulation is regarded as the volume-average particle diameter $D50v$, and the particle diameter at 84% cumulation is regarded as the volume particle diameter $D84v$.

When the volume particle size distribution of the particles in the particle-dispersed polyimide precursor solution according to the exemplary embodiment of the present disclosure cannot be easily measured by the method described above, measurement is performed by a method such as a dynamic light scattering method or the like.

The shape of the particles is preferably a spherical shape. When the porous polyimide film is formed by using the spherical particles, the porous polyimide film having spherical pores is formed.

In the specification of the present disclosure, the term "spherical shape" of the pores includes both a spherical shape and a substantially spherical shape (shape close to a spherical shape). Specifically, the spherical shape represents that particles having a ratio (long diameter/short diameter) of long diameter to short diameter of 1 or more and less than 1.5 are present at a ratio exceeding 80%. The ratio of particles having a ratio (long diameter/short diameter) of long diameter to short diameter of 1 or more and less than 1.5 is preferably 90% or more. The closer to 1 the ratio of long diameter to short diameter is, the closer to a true spherical shape the shape is.

Either the resin particles or the inorganic particles may be used as the particles, but the resin particles are preferably used.

The nearly spherical resin particles can be easily produced by a known production method such as emulsion polymerization as described below. Further, the resin particles and the polyimide precursor are organic materials, and thus the dispersibility of the particles in the coating film and the interfacial adhesion with the polyimide precursor are easily improved as compared with the inorganic particles. In addition, when the porous polyimide film is formed, the porous polyimide film having more nearly uniform pores and pore diameters can be easily formed. For these reasons, it is preferred to use the resin particles.

The inorganic particles are, for example, silica particles. The silica particles are preferred inorganic particles in view of availability of nearly spherical particles. For example, the porous polyimide film having nearly spherical pores can be formed by using the particle-dispersed polyimide precursor solution using the nearly spherical silica particles. However, the use of the silica particles as the particles has the tendency to produce fine racks in the polyimide film after imidization because volume contraction is hardly absorbed in the imidization. In this viewpoint, the resin particles are preferably used as the particles.

The content of the particles in the particle-dispersed polyimide precursor solution according to the exemplary embodiment of the present disclosure is within a range of 20% by mass or more and 90% by mass or less (preferably 25% by mass or more and 87% by mass or less and more preferably 30% by mass or more and 85% by mass or less) relative to 100 parts by mass of the solid content in the solution.

The specific materials of the resin particles and inorganic particles are described below.

—Resin Particle—

Examples of the resin particles include particles of resins such as vinyl polymers such as polystyrenes, poly(meth) acrylic acids, polyvinyl acetate, polyvinyl alcohol, polyvinyl butyral, polyvinyl ether, and the like; condensed polymers such as polyester, polyurethane, polyamide, and the like; hydrocarbon polymers such as polyethylene, polypropylene, polybutadiene, and the like; fluorocarbon polymers such as polytetrafluoroethylene, polyvinyl fluoride, and the like; and the like.

The meaning of "(meth)acrylic" includes both "acrylic" and "methacrylic". The meaning of "(meth)acrylic acids" includes methacrylic acid, methacrylate, and (meth)acrylamide.

The resin particles may be crosslinked or not be crosslinked. Crosslinking may be performed by combination with a difunctional monomer such as divinylbenzene, ethylene glycol dimethacrylate, nonane diacrylate, decanediol diacrylate, or the like, or a polyfunctional monomer such as trimethylolpropane triacrylate, trimethylolpropane trimethacrylate, or the like.

When the resin particles are vinyl resin particles, the particles are produced by polymerizing a monomer. The monomer of the vinyl resin is, for example, a monomer described below. Examples thereof include vinyl resin units produced by polymerizing monomers, such as styrene, alkyl-substituted styrene (for example, α-methylstyrene, 2-methylstyrene, 3-methylstyrene, 4-methylstyrene, 2-ethylstyrene, 3-ethylstyrene, 4-ethylstyrne, and the like), halogen-substituted styrene (for example, 2-chlorostyrene, 3-chlorostyrene, 4-chlorostyrene, and the like); styrenes each having a styrene skeleton, such as vinylnaphthalene and the like; (meth)acrylic acid esters such as methyl (meth)acrylate, ethyl (meth)acrylate, n-propyl (meth)acrylate, n-butyl (meth)acrylate, lauryl (meth)acrylate, 2-ethylhexyl (meth)acrylate, and the like; vinylnitriles such as acrylonitrile, methacrylonitrile, and the like; vinyl ethers such as vinyl methyl ether, vinyl isobutyl ether, and the like; vinyl ketones such as vinyl methyl ketone, vinyl ethyl ketone, vinyl isopropenyl ketone, and the like; acids such as (meth)acrylic acid, maleic acid, cinnamic acid, fumaric acid, vinylsulfonic acid, and the like; bases such as ethyleneimine, vinylpyridine, vinylamine, and the like; and the like.

A monofunctional monomer such as vinyl acetate or the like may be combined as another monomer.

Also, the vinyl resin may be a resin produced by using the monomers alone or a copolymer resin produced by using two or more monomers.

From the viewpoint of productivity and adaptability to particle removal described below, the resin particles are preferably resin particles of polystyrenes or poly(meth)acrylic acids. Specifically, resin particles of polystyrene, styrene-(meth)acrylic acid copolymer, or poly(meth)acrylic acid are more preferred, and resin particles of polystyrene or poly(meth)acrylic acid ester are most preferred. These resin particle types may be used alone or in combination of two or more.

The resin particles preferably maintain the shape thereof during the preparation of the polyimide precursor solution according to the exemplary embodiment of the present disclosure and during the application of the polyimide precursor solution and drying of the coating film (before the removal of the resin particles) for forming the porous polyimide. From this viewpoint, the glass transition temperature of the resin particles is 60° C. or more, preferably 70° C. or more, and still more preferably 80° C. or more.

The glass transition temperature is determined from a DSC curve obtained by differential scanning calorimetry (DSC), and specifically determined by "Extrapolated glass transition onset temperature" described in the method for determining a glass transition temperature in JIS K 7121-1987 "Testing Methods for Transition Temperatures of Plastics".

—Inorganic Particles—

Examples of the inorganic particles include inorganic particles such as silica (silicon dioxide) particles, magnesium oxide particles, alumina particles, zirconia particles, calcium carbonate particles, calcium oxide particles, titanium dioxide particles, zinc oxide particles, cerium oxide particles, and the like. As described above, the shape of the particles is preferably a spherical shape. From this viewpoint, the inorganic particles are preferably silica particles, magnesium oxide particles, calcium carbonate particles, and alumina particles are preferred, silica particles, titanium oxide particles, and alumina particles are more preferred, and silica particles are still more preferred. These inorganic particle types may be used alone or in combination of two or more.

When the inorganic particles in the solvent of the polyimide precursor solution have insufficient wettability and dispersibility, the surfaces of the inorganic particles may be modified according to demand. Examples of a method of surface modification include a method of treating with alkoxysilane having an organic group, such as a silane coupling agent; a method of coating with an organic acid such as oxalic acid, citric acid, lactic acid, or the like; and the like.

(Solvent)

The solvent is not particularly limited as long as there occurs a state where in the particle-dispersed polyimide precursor solution, the polyimide precursor is dissolved, and the particles are dispersed without being dissolved. The solvent may be either an organic solvent or an aqueous solvent. The solvent may be selected according to the state where the polyimide precursor is dissolved, and the particles are dispersed without being dissolved.

The solvent is, for example, an organic solvent or aqueous solvent described below. When the aqueous solvent is applied, an organic amine compound described below is preferably added for dissolving the polyimide precursor.

From the viewpoint of environment and cost, the solvent is preferably the aqueous solvent. In particular, when the resin particles are used as the particles, the aqueous solvent is preferably used because it is possible to create a state where the polyimide precursor is dissolved and, further, the resin particles are dispersed without being dissolved.

—Organic Solvent—

The organic solvent is selected so that it is possible to create a state where in the particle-dispersed polyimide precursor solution according to the exemplary embodiment of the present disclosure, the polyimide precursor is dissolved, and the particles are dispersed without being dissolved. In selecting the organic solvent, a mixed solvent of a good solvent (S1) for the polyimide precursor and a solvent (S2) other than the good solvent (S1) is preferred.

The good solvent (S1) for the polyimide precursor is used for preparing the polyimide precursor solution. In the exemplary embodiment of the present disclosure, the good solvent represents a solvent showing a polyimide precursor solubility of 5% by mass or more. Specific examples thereof include aprotic polar solvents such as N,N-dimethylformamide, N,N-dimethylacetamide, N-methylpyrrolidone, N-ethylpyrrolidone, tetramethylurea, 1,3-dimethyl-2-imidazolidinone, dimethyl propylene urea, dimethyl sulfoxide, γ-butyrolactone, β-propiolactone, γ-valerolactone, δ-valerolactone, γ-caprolactone, and the like.

Among these, N,N-dimethylacetamide, N-methylpyrrolidone, tetramethylurea, 1,3-dimethyl-2-imidazolidinone, dimethyl sulfoxide, and γ-butyrolactone are preferred, N,N-dimethylacetamide, N-methylpyrrolidone, tetramethylurea, dimethyl sulfoxide, γ-butyrolactone are more preferred, and N,N-dimethylacetamide, N-methylpyrrolidone, and γ-butyrolactone are still more preferred.

A solvent having low solubility of the particles used is selected as the solvent (S2) other than the good solvent (S1) for the polyimide precursor. A method for selecting the solvent is, for example, a method of adding the particles to a solvent as an object and selecting a solvent showing a dissolution amount of 3% by mass or less.

Examples of the solvent (S2) other than the good solvent (S1) for the polyimide precursor include hydrocarbon solvents such as n-decane, toluene, and the like; alcohol solvents such as isopropyl alcohol, 1-propanol, 1-butanol, 1-pentanol, phenethyl alcohol, and the like; glycol solvents such as ethylene glycol, propylene glycol, ethylene glycol monomethyl ether, 1-mothoxy-2-propanol, diethylene glycol monomethyl ether, triethylene glycol monomethyl ether, and the like; ether solvents such as diglyme, triglyme, tetraglyme, methyl cellosolve acetate, and the like; phenol solvents such as phenol, cresol, and the like; and the like.

When the resin particles are used as the particles, the solvent (S1) alone may dissolve not only the polyimide precursor but also the resin particles because of the very high polarity of the solvent (S1). Therefore, the mixing ratio between the solvent (S1) and the solvent (S2) may be determined so as not to dissolve the resin particles in the polyimide precursor solution. In addition, in order to prevent, for example, disturbance of the shape of pores due to dissolution of the resin particles during heating of the coating film of the particle-dispersed polyimide precursor solution, the boiling point of the solvent (S2) is preferably 10° C. or more, more preferably 20° C. or more, higher than that of the solvent (S1).

—Aqueous Solvent—

In the specification of the present disclosure, the aqueous solvent is specifically an aqueous solvent described below.

The aqueous solvent contains water. Specifically, the aqueous solvent is a solvent containing 50% by mass or more of water relative to the total aqueous solvent. Examples of water include distilled water, ion-exchange water, ultrafiltered water, pure water, and the like.

The content of water is preferably 50% by mass or more and 100% by mass or less, 70% by mass or more and 100% by mass or less, and sill more preferably 80% by mass or more and 100% by mass or less relative to the total aqueous solvent.

When the aqueous solvent contains a solvent other than water, the solvent other than water is, for example, a water-soluble organic solvent or an aprotic polar solvent. From the viewpoint of mechanical strength and the like of the porous polyimide film, a water-soluble solvent is preferred as the solvent other than water. The "water-soluble" represents that 1% by mass or more of an object substance is dissolved in water at 25° C.

In particular, from the viewpoint of improvement in the characteristics (for example, transparency, mechanical strength, heat resistance, electric characteristics, solvent resistance, etc.) of the porous polyimide film, the aqueous solvent may contain an aprotic polar solvent. In this case, in order to suppress dissolution and swelling of the particles in the particle-dispersed polyimide precursor solution, the content is 40% by mass or less and preferably 30% by mass or less relative to the total aqueous solvent. Also, in order to suppress dissolution and swelling of the resin particles when the film is formed by drying the polyimide precursor solution, the aprotic polar solvent is used at 3% by mass or more and 200% by mass or less, preferably 3% by mass or more and 100% by mass or less, more preferably 3% by mass or more and 50% by mass or less, and still more preferably 5% by mass or more and 50% by mass or less relative to the content (solid content) of the particles and the polyimide precursor in the particle-dispersed polyimide precursor solution.

The water-soluble organic solvents may be used alone or in combination of two or more.

When the resin particles are used as the particles, the water-soluble organic solvent preferably does not dissolve the resin particles. The reason for this is that for example, in the case of the aqueous solvent containing water and the water-soluble organic solvent, it is concerned that the resin particles are dissolved in the process of forming the coating film of the particle-dispersed polyimide precursor solution even when the resin particles are not dissolved in the resin particle dispersion.

When the resin particles are used as the particles and the water-soluble organic solvent which dissolves the resin particles is used as the aqueous solvent, in order to prevent dissolution and swelling of the particles in the particle-dispersed polyimide precursor solution, the amount of the water-soluble organic solvent is 40% by mass or less and preferably 30% by mass or less relative to the total aqueous solvent. Also, in order to prevent dissolution and swelling of the resin particles when the film is formed by dying the coating film of the particle-dispersed polyimide precursor solution, the amount of the water-soluble organic solvent used is 3% by mass or more and 50% by mass or less, preferably 5% by mass or more and 40% by mass or less, and more preferably 5% by mass or more and 35% by mass or less relative to the total amount of the particles and the polyimide precursor in the particle-dispersed polyimide precursor solution.

Examples of the water-soluble organic solvent include a water-soluble ether solvent, a water-soluble ketone solvent, and a water-soluble alcohol solvent described below.

The water-soluble ether solvent is a water-soluble solvent having an ether bond in a molecule thereof. Examples of the water-soluble ether solvent include tetrahydrofuran (THF), dioxane, trioxane, 1,2-dimethoxyethane, diethylene glycol dimethyl ether, diethylene glycol diethyl ether, and the like. Among these, tetrahydrofuran and dioxane are preferred as the water-soluble ether solvent.

The water-soluble ketone solvent is a water-soluble solvent having a ketone group in one molecule. Examples of the water-soluble ketone solvent include acetone, methyl ethyl ketone, cyclohexanone, and the like. Among these, acetone is preferred as the water-soluble ketone solvent.

The water-soluble alcohol solvent is a water-soluble solvent having an alcoholic hydroxyl group in one molecule. Examples of the water-soluble alcohol solvent include methanol, ethanol, 1-propanol, 2-propanol, tert-butyl alcohol, ethylene glycol, ethylene glycol monoalkyl ethers, propylene glycol, propylene glycol monoalkyl ethers, diethylene glycol, diethylene glycol monoalkyl ethers, 1,2-propanediol, 1,3-propanediol, 1,3-butanediol, 1,4-butanediol, 2,3-butanediol, 1,5-pentanediol, 2-butene-1,4-diol, 2-methyl-2,4-pentanediol, glycerin, 2-ethyl-2-hydroxymethyl-1,3-propanediol, 1,2,6-hexanetriol and the like. Among these, methanol, ethanol, 2-propanol, ethylene glycol, ethylene glycol monoalkyl ethers, propylene glycol, propylene glycol monoalkyl ethers, diethylene glycol, and diethylene glycol monoalkyl ethers are preferred as the water-soluble alcohol solvent.

When the aprotic polar solvent other than water is contained as the aqueous solvent, the aprotic polar solvent used in combination is a solvent having a boiling point of 150° C. or more and 300° C. or less and a dipole moment of 3.0 D or more 5.0 D or less. Examples of the aprotic polar solvent include N-methyl-2-pyrrolidone (NMP), N,N-dimethylformamide (DMF), N,N-dimethylacetamide (DMAc), dimethyl sulfoxide (DMSO), hexamethylene phosphoramide (HMPA), N-methylcaprolactam, N-acetyl-2-pyrrolidone, 1,3-dimethyl-2-imidazolidinone (DMI), N,N'-dimethylpropylene urea, tetramethyl urea, trimethyl phosphate, triethyl phosphate, and the like.

When a solvent other than water is contained as the aqueous solvent, the solvent used in combination has a boiling point of 270° C. or less, preferably 60° C. or more and 250° C. or less, and more preferably 80° C. or more and 230° C. or less. When the solvent used in combination has a boiling point within the range, the solvent other than water hardly remains in the polyimide film, and the polyimide film having high mechanical strength can be easily produced.

When the aqueous solvent is used as the solvent, the aqueous solvent preferably contains the organic amine compound described below and has a water ration of 50% by mass or more in the whole solvent. In addition, the aqueous solvent may contain 3% by mass or more and 50% by mass or less of the aprotic polar solvent relative to the total amount of the particles and the polyimide precursor.

(Organic Amine Compound)

When the solvent is the aqueous solvent, the organic amine compound for solubilization in water is added for dissolving the polyimide precursor. The organic amine compound is a compound which increases the solubility of the polyimide precursor in the aqueous solvent by forming an amine salt of the polyimide precursor (carboxyl group thereof) and which functions as an imidization promoter. Specifically, the organic amine compound is preferably a compound having a molecular weight of 170 or less. The organic amine compound is preferably a compound except for the diamine compound used as the raw material of the polyimide precursor.

The organic amine compound is preferably a water-soluble compound. The term "water-soluble" represents that 1% by mass or more of an object material is dissolved in water at 25° C.

The organic amine compound is, for example, a primary amine compound, a secondary amine compound, or a tertiary amine compound.

Among these, the organic amine compound is preferably at least one (particularly, the tertiary amine compound) selected from the secondary amine compound and the tertiary amine compound. When the tertiary amine compound or secondary amine compound (particular, the tertiary amine compound) is applied as the organic amine compound, it is possible to easily increase the solubility of the polyimide precursor in the solvent, easily improve film formability, and easily improve the storage stability of the polyimide precursor solution.

The organic amine compound is, for example, a divalent or higher polyvalent amine compound other than a monovalent amine compound. When a divalent of higher polyvalent amine compound is applied, a pseudo-crosslinked structure is easily formed between polyimide precursor molecules, and the storage stability of the polyimide precursor solution is easily improved.

Examples of the primary amine compound include methylamine, ethylamine, n-propylamine, isopropylamine, 2-ethanolamine, 2-mino-2-methyl-1-propanol, and the like.

Examples of the secondary amine compound include dimethylamine, 2-(methylamino)ethanol, 2-(ethylamino)ethanol, morpholine, and the like.

Examples of the tertiary amine compound include 2-dimethylaminoethanol, 2-diethylaminoethanol, 2-dimethylaminopropanol, pyridine, triethylamine, picoline, N-methylmorpholine, N-ethylmorpholine, 1,2-dimethylimidazole, 2-ethyl-4-methylimidazole, and the like.

From the viewpoint of the pot life of the polyimide precursor solution and film thickness uniformity, the tertiary amine compound is preferred. From this viewpoint, more preferred is at least one selected from the group consisting of 2-dimethylaminoethanol, 2-diethylaminoethaol, 2-dimethylaminopropanol, pyridine, triethylamine, picoline, N-methylmorpholine, N-ethylmorpholine, 1,2-dimethylimidazole, 2-ethyl-4-methylimidazole, N-methylpiperidine, and N-ethylpiperidine. Further, most preferred is at least one selected from the group consisting of 2-dimethylaminoethanol, 2-diethylaminoethanol, 2-dimethylaminopropanol, triethylamine, N-methylmorpholine, N-ethylmorpholine, 1,2-dimethylimidazole, 2-ethyl-4-methylimidazole, N-methylpiperidine, and N-ethylpiperidine.

From the viewpoint of film formability, the organic amine compound is preferably also an amine compound (particularly, a tertiary amine compound) having a heterocyclic structure containing nitrogen. Examples of the amine compound (hereinafter, referred to as the "nitrogen-containing heterocyclic amine compound") having a heterocyclic structure containing nitrogen include isoquinolines (compounds having an isoquinoline skeleton), pyridines (amine compounds having a pyridine skeleton), pyrimidines (amine compounds having a pyrimidine skeleton), pyrazines (amine compounds having a pyrazine skeleton), piperazines (amine compounds having a piperazine skeleton), triazines (amine compounds having a triazine skeleton), imidazoles (amine compounds having an imidazole skeleton), morpholines (amine compounds having a morpholine skeleton), polyaniline, polypyridine, polyamine, and the like.

From the viewpoint of film formability, the nitrogen-containing heterocyclic amine compound is preferably at least one selected from the group consisting of morpholines, pyridines, piperidines, and imidazoles, and more preferably morpholines (amine compounds having a morpholine skeleton). Among these, more preferably is at least one selected from the group consisting of N-methylmorpholine, N-methylpiperidine, pyridine, 1,2-dimethylimidazole, 2-ethyl-4-methylimidazole, and picoline, and still more preferably N-methylmorpholine.

Among these, the organic amine compound is preferably a compound having a boiling point of 60° C. or more (preferably 60° C. or more and 200° C. or less and more preferably 70° C. or more and 150° C. or less). With the organic amine compound having a boiling point of 60° C. or more, evaporation of the organic amine compound from the polyimide precursor solution is suppressed, and a decrease in solubility of the polyimide precursor in the solvent is easily suppressed.

The content of the organic amine compound is preferably 50 mole % or more and 500 mol$ or less, more preferably 80 mol % or more and 250 mol % or less, and still more preferably 90 mol % or more and 200 mol % or less relative to carboxyl groups (—COOH) of the polyimide precursor in the polyimide precursor solution.

When the content of the organic amine compound is within the range, it is possible to easily increase the solubility of the polyimide precursor in the aqueous solvent, easily improve film formability, and easily improve the storage stability of the polyimide precursor solution.

These organic amine compounds may be used alone or in combination of two or more.

(Other Additives)

The particle-dispersed polyimide precursor solution according to the exemplary embodiment of the present disclosure may contain a catalyst for promoting imidization reaction, and a leveling agent for improving film quality, etc.

Examples of the catalyst for promoting imidization reaction include acid catalysts such as a dehydrant such as an acid anhydride or the like, a phenol derivative, a sulfonic acid derivative, a benzoic acid derivative, and the like.

Also, for example, a conductive material (for example, conductivity (for example, a volume resistivity of less than $10^7$ Ω·cm or semiconductivity (for example, a volume resistivity of $10^7$ Ω·cm or more and $10^{13}$ Ω·cm or less)) added for imparting conductivity may be contained.

Examples of the conductive material include carbon black (for example, acid carbon black at pH 5.0 or less); metals (for example, aluminum, nickel, and the like); metal oxides (for example, yttrium oxide, tin oxide, and the like); ion-conductive materials (for example, potassium titanate, LiCl, and the like); and the like. These conductive materials may be used alone or in combination of two or more.

—Method for Preparing Particle-Dispersed Polyimide Precursor Solution—

Examples of the method for preparing the particle-dispersed polyimide precursor solution according to the exemplary embodiment of the present disclosure include the following methods (i) and (ii).

(i) A method of preparing a polyimide precursor solution and then mixing and dispersing the particles.

(ii) A method of preparing a particle dispersion and synthesizing the polyimide precursor in the dispersion.

(i) Method of Preparing a Polyimide Precursor Solution and then Mixing and Dispersing the Particles.

First, the polyimide precursor solution before dispersion of the particles is prepared by a method of polymerizing, in a solvent, tetracarboxylic dianhydride with a diamine compound by a known method to produce a resin (polyimide precursor).

In the case of the aqueous solvent, the polyimide precursor solution can be prepared by polymerization using the aqueous solvent described above in the presence of the organic amine. In another example, tetracarboxylic dianhydride is polymerized with the diamine compound in the organic solvent such as the aprotic polar solvent or the like (for example, N-methylpyrrolidone (NMP) or the like) to produce the resin (polyimide precursor), and then the resin (polyimide precursor) is precipitated by adding to an aqueous solvent such as water, alcohol, or the like. Then, the polyimide precursor and the organic amine are dissolved in the aqueous solvent to prepare the polyimide precursor solution.

Next, the particles are mixed and dispersed in the resultant polyimide precursor solution.

In forming the resin particles, for example, when the resin particles are vinyl resin particles, the resin particles can be formed in the aqueous solvent by a known polymerization method (a radial polymerization method such as emulsion polymerization, soap-free emulsion polymerization, suspension polymerization, mini-emulsion polymerization, micro-emulsion polymerization, or the like).

For example, when the emulsion polymerization method is applied to production of the vinyl resin particles, a monomer such as styrene, (meth)acrylic acid, or the like is added to the aqueous solvent in which a water-soluble polymerization initiator such as potassium persulfate, ammonium persulfate, or the like has been dissolved. Further, if required, a surfactant such as sodium dodecylsulfate, diphenyl oxide disulfonate salt, or the like is added and subjected to polymerization by heating under stirring to produce the vinyl resin particles.

When the particle-dispersed polyimide precursor solution according to the exemplary embodiment of the present disclosure is prepared in the aqueous solvent, the resin particle aqueous solvent dispersion prepared by the method described above is mixed and stirred with the polyimide precursor solution prepared as described above, preparing the particle-dispersed polyimide precursor solution.

When the particle-dispersed polyimide precursor solution according to the exemplary embodiment of the present disclosure is prepared in the organic solvent, the resin particles are taken out as a powder by a known method such as reprecipitation, freeze drying, or the like of the resin particle aqueous solvent dispersion, and then mixed and stirred with the polyimide precursor solution prepared as described above. Alternatively, the resin particle powder taken out may be re-dispersed in an organic solvent (may be s single or a mixed solvent), which does not dissolve the resin particles, and then mixed and stirring with the polyimide precursor solution.

In the addition, the mixing, stirring, and dispersion methods are not particularly limited. In order to improve dispersibility of the particles, a known nonionic or ionic surfactant may be added.

When commercial particles (resin particles or inorganic particles) are used, the particle available as a powder can be mixed and dispersed at a desired concentration regardless of whether the solvent of the particle-dispersed polyimide precursor solution is the organic solvent or the aqueous solvent. In the case of the particles available as a particle dispersion, the particle dispersion is mixed and dispersed with the polyimide precursor solution prepared as described above by the same method as for forming the particles described above, thereby preparing the particle-dispersed polyimide precursor solution.

(ii) Method of Preparing a Particle Dispersion and Forming Polyimide Precursor in the Dispersion When the particle-dispersed polyimide precursor solution according to the exemplary embodiment of the present disclosure is prepared in the organic solvent, first a solution is prepared by dispersing the particles in the organic solvent which dissolves the polyimide precursor but not dissolve the particles. Next, a resin (polyimide precursor) is produced by polymerizing, in the solution, tetracarboxylic dianhydride with the diamine compound to prepare the particle-dispersed polyimide precursor solution.

When the particle-dispersed polyimide precursor solution according to the exemplary embodiment of the present disclosure is prepared in the aqueous solvent, first an aqueous solvent dispersion of the particles is prepared. Next, in the solution, a resin (polyimide precursor) is produced by polymerizing tetracarboxylic dianhydride with the diamine compound in the presence of the organic amine, thereby preparing the particle-dispersed polyimide precursor solution.

When the resin particles are used as the particles, in order to improve dispersibility in the particle-dispersed polyimide precursor solution according to the exemplary embodiment of the present disclosure, the surfaces of the resin particles may be coated with a resin having a chemical structure different from the original resin. The coating resin may be changed according to the solvent and the chemical structure of the polyimide precursor used. The coating resin is, for example, a resin having an acid group or basic group. For example, when the vinyl resin particles are produced by emulsion polymerization, a method for coating the resin particle surfaces with the resin is, for example, a method of polymerizing a monomer derived from the original resin particles, then, after the end of polymerization, adding a small amount of a monomer having an acid group or basic group, such as methacrylic acid, 2-dimethylaminoethyl methacrylate, or the like, and continuously polymerizing the monomer.

Among these methods, the method for preparing the particle-dispersed polyimide precursor solution according to the exemplary embodiment of the present disclosure is preferably the method (ii) in view of the possibility to improve the particle dispersibility.

EXAMPLES

Examples are described below, but the present disclosure is not limited to these examples. In addition, in description below, "parts" and "%" are on mass basis unless otherwise specified.

[Preparation of Particle Dispersion]
—Preparation of Resin Particle Dispersion (1)—

First, 670 parts by mass of methyl methacrylate, 12.1 parts by mass of surfactant Dowfax 2A1 (47% solution, manufactured by Dow Chemical Company), and 670 parts by mass of ion exchange water are mixed and then stirred and emulsified by a dissolver at 1,500 revolutions for 30 minutes, forming a monomer emulsion.

In a reactor, 1.10 parts by mass of Dowfax 2A1 (47% solution, manufactured by Dow Chemical Company) and 1500 parts by mass of ion exchange water are filled. The resultant mixture is heated to 75° C. in a nitrogen stream, and then 70 parts by mass of the monomer emulsion is added to the mixture. Then, a polymerization initiator solution prepared by dissolving 15 parts by mass of ammonium persulfate in 98 parts by mass of ion exchange water is added dropwise over 10 minutes. After reaction for 50 minutes after dropwise addition, the remaining monomer emulsion is added dropwise over 220 minutes and further reacted for 50 minutes. Next, a solution prepared by mixing 5 parts by mass of methacrylic acid with 10 parts by mass of ion exchange water is added dropwise over 5 minutes and reacted for 150 minutes. Then, the reaction solution is cooled to produce a resin particle dispersion (1). The resultant resin particles have an average particle diameter of 0.81 μm. The average particle diameter is the volume-average particle diameter measured by the method described above (the same applies below).

—Preparation of Resin Particle Dispersion (2)—

First, 670 parts by mass of methyl methacrylate, 32.1 parts by mass of surfactant Dowfax 2A1 (47% solution, manufactured by Dow Chemical Company), and 670 parts by mass of ion exchange water are mixed and stirred and emulsified by a dissolver at 1,500 revolutions for 30 minutes, forming a monomer emulsion.

In a reactor, 1.10 parts by mass of Dowfax 2A1 (47% solution, manufactured by Dow Chemical Company) and 1500 parts by mass of ion exchange water are filled. The resultant mixture is heated to 75° C. in a nitrogen stream, and then 70 parts by mass of the monomer emulsion is added to the mixture. Then, a polymerization initiator solution prepared by dissolving 15 parts by mass of ammonium persulfate in 98 parts by mass of ion exchange water is added dropwise over 10 minutes. After reaction for 50 minutes after dropwise addition, the remaining monomer emulsion is added dropwise over 220 minutes and further reacted for 50 minutes. Next, a solution prepared by mixing 5 parts by mass of methacrylic acid with 10 parts by mass of ion exchange water is added dropwise over 5 minutes and reacted for 150 minutes. Then, the reaction solution is cooled to produce a resin particle dispersion (2). The resultant resin particles have an average particle diameter of 0.30 μm.

—Preparation of Resin Particle Dispersion (3)—

First, 670 parts by mass of methyl methacrylate, 10.5 parts by mass of surfactant Dowfax 2A1 (47% solution, manufactured by Dow Chemical Company), and 576 parts by mass of ion exchange water are mixed and stirred and emulsified by a dissolver at 1,500 revolutions for 30 minutes, forming a monomer emulsion.

In a reactor, 1.10 parts by mass of Dowfax 2A1 (47% solution, manufactured by Dow Chemical Company), and 1500 parts by mass of ion exchange water are filled. The resultant mixture is heated to 75° C. in a nitrogen stream, and then 50 parts by mass of the monomer emulsion is added to the mixture. Then, a polymerization initiator solution prepared by dissolving 15 parts by mass of ammonium persulfate in 98 parts by mass of ion exchange water is added dropwise over 10 minutes. After reaction for 50 minutes after dropwise addition, 20 parts by mass of the monomer emulsion is added dropwise over 10 minutes and further reacted for 50 minutes. Then, the remaining monomer emulsion is added dropwise over 10 minutes and is further reacted for 120 minutes. Then, the reaction solution is cooled to produce a resin particle dispersion (3). The resultant resin particles have an average particle diameter of 1.20 μm.

—Preparation of Resin Particle Dispersion (4)—

First, 670 parts by mass of methyl methacrylate, 29.2 parts by mass of surfactant Dowfax 2A1 (47% solution, manufactured by Dow Chemical Company), and 670 parts by mass of ion exchange water are mixed and stirred and emulsified by a dissolver at 1,500 revolutions for 30 minutes, forming a monomer emulsion.

In a reactor, 1.10 parts by mass of Dowfax 2A1 (47% solution, manufactured by Dow Chemical Company), and 1500 parts by mass of ion exchange water are filled. The resultant mixture is heated to 75° C. in a nitrogen stream, and then 70 parts by mass of the monomer emulsion is added to the mixture. Then, a polymerization initiator solution prepared by dissolving 15 parts by mass of ammonium persulfate in 98 parts by mass of ion exchange water is added dropwise over 10 minutes. After reaction for 50 minutes after dropwise addition, the remaining monomer emulsion is added dropwise over 220 minutes and further reacted for 50 minutes. Next, a solution prepared by mixing 5 parts by mass of methacrylic acid with 10 parts by mass of ion exchange water is added dropwise over 5 minutes and reacted for 150 minutes. Then, the reaction solution is cooled to produce a resin particle dispersion (4). The resultant resin particles have an average particle diameter of 0.60 μm.

—Preparation of Resin Particle Dispersion (5)—

First, 670 parts by mass of methyl methacrylate, 25.0 parts by mass of surfactant Dowfax 2A1 (47% solution, manufactured by Dow Chemical Company), and 670 parts by mass of ion exchange water are mixed and stirred and emulsified by a dissolver at 1,500 revolutions for 30 minutes, forming a monomer emulsion.

In a reactor, 1.10 parts by mass of Dowfax 2A1 (47% solution, manufactured by Dow Chemical Company), and 1500 parts by mass of ion exchange water are charged. The resultant mixture is heated to 75° C. in a nitrogen stream, and then 70 parts by mass of the monomer emulsion is added to the mixture. Then, a polymerization initiator solution prepared by dissolving 15 parts by mass of ammonium persulfate in 98 parts by mass of ion exchange water is added dropwise over 10 minutes. After reaction for 50 minutes after dropwise addition, the remaining monomer emulsion is added dropwise over 220 minutes and further reacted for 50 minutes. Next, a solution prepared by mixing 5 parts by mass of methacrylic acid with 10 parts by mass of ion exchange water is added dropwise over 5 minutes and reacted for 150 minutes. Then, the reaction solution is cooled to produce a resin particle dispersion (5). The resultant resin particles have an average particle diameter of 0.42 μm.

—Preparation of Resin Particle Dispersion (6)—

First, 670 parts by mass of methyl methacrylate, 38.1 parts by mass of surfactant Dowfax 2A1 (47% solution, manufactured by Dow Chemical Company), and 576 parts by mass of ion exchange water are mixed and then stirred and emulsified by a dissolver at 1,500 revolutions for 30 minutes, forming a monomer emulsion.

In a reactor, 1.10 parts by mass of Dowfax 2A1 (47% solution, manufactured by Dow Chemical Company), and 1500 parts by mass of ion exchange water are filled. The resultant mixture is heated to 75° C. in a nitrogen stream, and then 70 parts by mass of the monomer emulsion is added to the mixture. Then, a polymerization initiator solution prepared by dissolving 15 parts by mass of ammonium persulfate in 98 parts by mass of ion exchange water is added dropwise over 10 minutes. After reaction for 50 minutes after dropwise addition, the remaining monomer emulsion is added dropwise over 220 minutes and further reacted for 50 minutes. Next, a solution prepared by mixing 5 parts by mass of methacrylic acid with 10 parts by mass of ion exchange water is added dropwise over 5 minutes and reacted for 150 minutes. Then, the reaction solution is cooled to produce a resin particle dispersion (6). The resultant resin particles have an average particle diameter of 0.16 μm.

—Preparation of Silica Particle Dispersion (1)—

Thirty parts by mass of spherical silica particles (manufactured by Nippon Shokubai Co., Ltd.) having an average particle diameter of 2.5 μm are dispersed in 30 parts by mass of N-methyl pyrrolidone (NMP).

—Preparation of Silica Particle Dispersion (2)—

Thirty parts by mass of spherical silica particles (manufactured by Toagosei Co., Ltd.) having an average particle diameter of 3.5 μm are dispersed in 30 parts by mass of N-methyl pyrrolidone (NMP).

—Preparation of Silica Particle Dispersion (3)—

Thirty parts by mass of spherical silica particles (manufactured by Fuji Silysia Chemical Ltd.) having an average particle diameter of 4.5 μm are dispersed in 30 parts by mass of N-methyl pyrrolidone (NMP).

—Preparation of Silica Particle Dispersion (4)—

Thirty parts by mass of spherical silica particles (manufactured by Admatechs Co., Ltd.) having an average diameter of 6 μm are dispersed in 30 parts by mass of N-methyl pyrrolidone (NMP).

—Preparation of Silica Particle Dispersion (5)—

Thirty parts by mass of spherical silica particles (manufactured by Suzuki Yushi Kogyo KK) having an average particle diameter of 9 μm are dispersed in 30 parts by mass of N-methyl pyrrolidone (NMP).

—Preparation of Silica Particle Dispersion (6)—

Thirty parts by mass of spherical silica particles (manufactured by Fuji Silysia Chemical Ltd.) having an average particle diameter of 10 μm are dispersed in 30 parts by mass of N-methyl pyrrolidone (NMP).

—Preparation of Silica Particle Dispersion (7)—

Thirty parts by mass of spherical silica particles (manufactured by Denka Co., Ltd.) having an average particle diameter of 13 μm are dispersed in 30 parts by mass of N-methyl pyrrolidone (NMP).

[Preparation of Resin Particle-Dispersed Polyimide Precursor Solution (A1)]

Resin particle dispersion (1): prepared by adding ion exchange water to 100 g of resin particles in terms of solid content and adjusting the solid content concentration of the resin particles to 25% by ass.

To the resin particle dispersion, 9.59 g (88.7 milli moles) of p-phenylenediamine (molecular weight: 108.14) and 25.58 g (86.9 milli moles) of 3,3',4,4'-biphenyltetracarboxylic dianhydride (molecular weight: 294.22) are added and dispersed by stirring at 20° C. for 10 minutes. Next, 25.0 g (247.3 milli moles) of N-methylmorpholine (organic amine compound) is slowly added to the resultant dispersion and dissolved and reacted for 24 hours while being maintained at a reaction temperature of 60° C., preparing a resin particle-dispersed polyimide precursor solution (A1) (resin particle/polyimide precursor=100/35.2 (mass ratio), polyimide precursor concentration in the solution: about 6.6% by mass).

[Preparation of Resin Particle-Dispersed Polyimide Precursor Solutions (A2) to (A9), (RA1), and (RA2)]

Each of resin particle-dispersed polyimide precursor solutions (A2) to (A9) for forming a porous polyimide film of each of the examples is prepared by the same method as for preparing the resin particle-dispersed polyimide precursor solution (A1) except that the type of the resin particles used is changed according to Table 1. Also, resin particle-dispersed polyimide precursor solutions (RA1) and (RA2) are prepared by the same method as for preparing the resin particle-dispersed polyimide precursor solution (A1) except that the mass ratio of particle/polyimide precursor is changed.

[Preparation of Silica Particle-Dispersed Polyimide Precursor Solution (B1)]

In a flask provided with a stirrer, a thermometer, and a dropping funnel, 900 g of N-methylpyrrolidone is filled. In addition, 27.28 g (252.27 milli moles) of p-phenylenediamine (molecular weight: 108.14) is added and dispersed by stirring at 20° C. for 10 minutes. To the resultant solution, 72.72 g (247.16 milli moles) of 3,3',4,4'-biphenyltetracarboxylic dianhydride (molecular weight: 294.22) is added and dissolved and reacted by stirring for 24 hours while the reaction temperature is maintained at 20° C., preparing a polyimide precursor solution.

In 100 parts by mass of the resultant polyimide precursor solution, the silica particle dispersion (1) is mixed and stirring so that the ratio of particle/polyimide precursor is as shown in Table 1, preparing a silica particle-dispersed polyimide precursor solution (B1).

[Preparation of Silica Particle-Dispersed Polyimide Precursor Solutions (B2) to (B7), (RB1), and (RB2)]

Each of silica particle-dispersed polyimide precursor solutions (B2) to (B7) for producing a porous polyimide film of each of the examples is prepared by the same method as for preparing the silica particle-dispersed polyimide precursor solution (B1) except that the type of the silica particles used is changed according to Table 1, and the thickness is changed. Also, silica particle-dispersed polyimide precursor solutions (RB1) and (RB2) are prepared by the same method as for preparing the silica particle-dispersed polyimide precursor solution (B1) except that the type of silica particles and the mass ratio of particle/polyimide precursor are changed.

[Formation of Porous Polypropylene Films RPP-1 and RPP-2]

Porous polypropylene films having the characteristics shown in Table 2 are prepared as a holding body for holding a solid electrolyte.

[Formation of Porous Polyimide Films (PI-1 to PI-9, RPI-1, and RPI-2)]

First, an aluminum plate is prepared for forming a coating film of each of the resin particle-dispersed polyimide precursor solutions prepared as described above. Then, a solution prepared by dissolving a release agent KS-700 (manufactured by Shin-Etsu Chemical Co., Ltd.) in toluene is applied on the surface of the aluminum plate so that the thickness after drying is about 0.05 µm and then heat-treated at 400° C. to provide a release layer.

Next, the resin particle-dispersed polyimide precursor solution is applied on the release layer of the aluminum plate so that the thickness after drying is about 30 µm to form a coating film. The coating film is dried by heating at 90° C. for 1 hour. Then, the coating film is heated from room temperature (25° C., the same applies below) to 380° C. at a rate of 10° C./min, maintained at 380° C. for 1 hour, and then cooled to room temperature to form a porous polyimide film having a thickness of about 30 µm. Also, each porous polyimide film is formed by the same method as described above except that the particle-dispersed polyimide precursor solution is changed according to Table 1, and the thickness is changed according to Table 2.

[Formation of Porous Polyimide Films (PI-10 to PI-16, RPI-3, and RPI-4)]

First, an aluminum plate is prepared for forming a coating film of each of the silica particle-dispersed polyimide precursor solutions prepared as described above. Then, a solution prepared by dissolving a release agent KS-700 (manufactured by Shin-Etsu Chemical Co., Ltd.) in toluene is applied on the surface of the aluminum plate so that the thickness after drying is about 0.05 µm and then heat-treated at 400° C. to provide a release layer.

Next, the silica particle-dispersed polyimide precursor solution is applied on the release layer of the aluminum plate so that the thickness after drying is about 300 µm to form a coating film. The coating film is dried by heating at 120° C. for 1 hour. Then, the coating film is separated from the aluminum plate and is heated from room temperature to 380° C. at a rate of 10° C./min, maintained at 380° C. for 1 hour, and then cooled to room temperature to form a silica particle-containing polyimide composite film having a thickness of about 300 µm. The resultant silica particle-containing polyimide composite film is immersed in an aqueous 10% by mass hydrofluoric acid solution to remove the silica particles by dissolution over 6 hours. Then, the film is further washed with water and dried to form a porous polyimide film. Also, a porous polyimide film of each of the examples is formed by the same method as described above except that the particle-dispersed polyimide precursor solution is changed according to Table 1, and the thickness is changed according to Table 2.

TABLE 1

| Porous film | Particle-dispersed PI precursor solution | Resin particle dispersion | Silica particle dispersion | Average particle diameter of particles | Particle/PI precursor Mass ratio |
|---|---|---|---|---|---|
| PI-1 | A1 | 1 | — | 0.81 | 100/35.2 |
| PI-2 | A2 | 2 | — | 0.30 | 100/35.2 |
| PI-3 | A3 | 3 | — | 1.20 | 100/35.2 |
| PI-4 | A4 | 4 | — | 0.60 | 100/35.2 |
| PI-5 | A5 | 5 | — | 0.42 | 100/35.2 |
| PI-6 | A6 | 6 | — | 0.16 | 100/35.2 |
| PI-7 | A7 | 2 | — | 0.30 | 100/35.2 |
| PI-8 | A8 | 2 | — | 0.30 | 100/35.2 |
| PI-9 | A9 | 6 | — | 0.16 | 100/35.2 |
| PI-10 | B1 | — | 1 | 2.5 | 100/35.2 |
| PI-11 | B2 | — | 2 | 3.5 | 100/35.2 |
| PI-12 | B3 | — | 3 | 4.5 | 100/35.2 |
| PI-13 | B4 | — | 4 | 6 | 100/35.2 |
| PI-14 | B5 | — | 5 | 9 | 100/35.2 |
| PI-15 | B6 | — | 6 | 10 | 100/35.2 |
| PI-16 | B7 | — | 6 | 10 | 100/35.2 |
| RPI-1 | RA1 | 1 | — | 0.81 | 100/60 |
| RPI-2 | RA2 | 1 | — | 0.81 | 100/25 |
| RPI-3 | RB1 | — | 7 | 13 | 100/60 |
| RPI-4 | RB2 | — | 7 | 13 | 100/25 |

[Characteristics of Porous Film]
(Void Ratio)

The weight of the formed porous polyimide film is measured, and the thickness is measured according to JIS K7130 (1992). Also, the true specific gravity is measured by using a dry automatic densitometer (Acupic II 1340-10 ml) manufactured by Shimadzu Corporation, and a void ratio is measured according to the formula described above.

(Pore Diameter and Pore Circularity)

The pore diameter (average value of pore diameters) and pore circularity are observed and measured by a scanning electron microscope (SEM) as described above.

(Ratio of Pore with Ratio (Long Diameter/Short Diameter) of 1.5 or More)

The porous polyimide film of each of the examples is observed and measured by the method described above.

(Filling Rate of Solid Electrolyte)

The filling rate of the solid electrolyte filled in pores of the porous polyimide film is determined as described above, specifically as follows. First, the weight and thickness of the porous film of each of the examples are measured, and the density is calculated. Then, the solid electrolyte is laminated on the porous film of each of the examples, and the solid electrolyte is impregnated into the pores of the porous film by pressing under a pressure (150 to 700 N/m$^2$). Next, the weight and thickness of the porous film after impregnation are measured, and the density is calculated. The filling rate is calculated by the formula described above using the densities of the porous film before and after impregnation of the solid electrolyte.

Examples 1 to 18 and Comparative Examples 1 to 6

A positive electrode current collector made of a metal (made of aluminum), a positive electrode active material layer made of a material described below, a solid electrolyte layer, and a negative electrode active material layer made of a material described below, and a negative electrode current collector made of a metal (made of aluminum) are laminated in that order to form an all-solid-state battery. The solid electrolyte layer is formed by laminating a sulfide-based solid electrolyte made of a material described below and a porous film serving as a holding body for the solid electrolyte are laminated, and the solid electrolyte is impregnated into the pores of the porous film by pressing under a pressure (150 to 700 N/m²)

—Material—

Positive electrode active material: LiCoO₂, LiNiO₂, LiMnO₂

Negative electrode active material: natural graphite

Solid electrolyte: Li—P—S-based glass

[Evaluation]

(Cycle Electric Characteristics)

An all-solid-state battery is produced by using the porous polyimide film formed in each of the examples according to procedures described below. Next, a charge-discharge cycle test (IC) of the produced all-solid-state battery at room temperature (25° C.) between a voltage of 3.0 V and 4.2 V is performed in 100 cycles (that is, 100-times repeated charge and discharge (IC charge and IC discharge at 25° C.)). After 100 cycles, the capacity retention rate of battery capacity of the all-solid-state battery is measured. The hither the capacity retention rate, the better the cycle characteristics.

TABLE 2

| | | Characteristics of porous film | | | | | | |
|---|---|---|---|---|---|---|---|---|
| | Porous film | Void ratio (%) | Pore diameter (μm) | Filling rate (%) | Pore circularity | Ratio of pore with ratio (long diameter/short diameter) ≥ 1.5 (%) | Film thickness μm | Ratio of porous film in solid electrolyte layer | Evaluation Cycle characteristic |
| Example 1 | PI-1 | 77 | 0.81 | 72 | 0.95 | 5 | 30 | 1.0 | 92 |
| Example 2 | PI-2 | 70 | 0.30 | 65 | 0.91 | 7 | 25 | 1.0 | 78 |
| Example 3 | PI-3 | 73 | 1.20 | 58 | 0.90 | 6 | 26 | 1.0 | 73 |
| Example 4 | PI-4 | 65 | 0.60 | 60 | 0.92 | 8 | 25 | 1.0 | 90 |
| Example 5 | PI-5 | 70 | 0.42 | 66 | 0.93 | 6 | 25 | 1.0 | 88 |
| Example 6 | PI-6 | 60 | 0.16 | 55 | 0.89 | 8 | 25 | 1.0 | 60 |
| Example 7 | PI-7 | 61 | 0.30 | 56 | 0.91 | 8 | 27 | 1.0 | 67 |
| Example 8 | PI-8 | 74 | 0.30 | 68 | 0.91 | 8 | 26 | 1.0 | 79 |
| Example 9 | PI-9 | 70 | 0.16 | 65 | 0.89 | 8 | 24 | 1.0 | 65 |
| Example 10 | PI-10 | 73 | 2.5 | 67 | 0.88 | 9 | 300 | 1.0 | 70 |
| Example 11 | PI-11 | 74 | 3.5 | 68 | 0.88 | 9 | 400 | 1.0 | 68 |
| Example 12 | PI-12 | 75 | 4.5 | 69 | 0.88 | 10 | 500 | 1.0 | 67 |
| Example 13 | PI-13 | 76 | 6 | 70 | 0.87 | 10 | 600 | 1.0 | 69 |
| Example 14 | PI-14 | 77 | 9 | 71 | 0.87 | 10 | 650 | 1.0 | 65 |
| Example 15 | PI-15 | 77 | 10 | 71 | 0.87 | 11 | 700 | 1.0 | 62 |
| Example 16 | PI-16 | 60 | 10 | 56 | 0.87 | 12 | 800 | 1.0 | 58 |
| Example 17 | PI-2 | 70 | 0.30 | 65 | 0.91 | 8 | 30 | 0.5 | 66 |
| Example 18 | PI-2 | 70 | 0.30 | 65 | 0.91 | 8 | 30 | 0.75 | 70 |
| Comparative Example 1 | RPP-1 | 35 | 0.17 | 12 | 0.43 | 75 | 21 | 1.0 | 32 |
| Comparative Example 2 | RPP-2 | 30 | 0.08 | 10 | 0.31 | 68 | 22 | 1.0 | 25 |
| Comparative Example 3 | RPI-1 | 40 | 0.81 | 34 | 0.95 | 6 | 30 | 1.0 | 40 |
| Comparative Example 4 | RPI-2 | 82 | 0.81 | 42 | 0.95 | 7 | 30 | 1.0 | 42 |
| Comparative Example 5 | RPI-3 | 40 | 13 | 25 | 0.85 | 11 | 30 | 1.0 | 21 |
| Comparative Example 6 | RPI-4 | 82 | 13 | 40 | 0.85 | 11 | 30 | 1.0 | 27 |

The results described above indicate that the examples show the good cycle characteristics as compared with the comparative examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An all-solid-state battery comprising:
    a positive electrode active material layer containing a positive electrode active material;
    a negative electrode active material layer containing a negative electrode active material; and
    a solid electrolyte layer containing a solid electrolyte and a porous polyimide film which holds the solid electrolyte, wherein the porous polyimide film has (i) pores with a spherical shape, and (ii) a void ratio of 60% or more and 80% or less, and wherein the pores have a pore diameter of 0.1 μm or more and 10 μm or less, and a number of the pores having a ratio (long diameter/short diameter) of long diameter to short diameter of 5 or more is 20% or less.

2. The all-solid-state battery according to claim 1, wherein the number of the pores having the ratio (long diameter/short diameter) of 1.5 or more is 15% or less.

3. The all-solid-state battery according to claim 1, wherein the pores in the porous polyimide film have a circularity of 0.85 or more.

4. The all-solid-state battery according to claim 3, wherein the circularity is 0.90 or more.

5. The all-solid-state battery according to claim 1, wherein the average film thickness is 10 μm or more and 1000 μm or less.

6. The all-solid-state battery according to claim 5, wherein the average film thickness is 20 μm or more and 500 μm or less.

7. The all-solid-state battery according to claim 1, wherein a ratio (thickness of porous polyimide film/total thickness of solid electrolyte layer) of a thickness of the porous polyimide film to a total thickness of the solid electrolyte layer is 0.5 or more.

8. The all-solid-state battery according to claim 7, wherein the ratio (thickness of porous polyimide film/total thickness of solid electrolyte layer) is 0.9 or more.

9. The all-solid-state battery according to claim 1, wherein the solid electrolyte contains a sulfide solid electrolyte.

10. The all-solid-state battery according to claim 9, wherein the sulfide solid electrolyte is a solid electrolyte containing at least one constituent element selected from the group consisting of sulfur, lithium, and phosphorus.

11. The all-solid-state battery according to claim 1, wherein the porous polyimide film has a void ratio of 60% or more and 77% or less.

12. An all-solid-state battery comprising:
a positive electrode active material layer containing a positive electrode active material;
a negative electrode active material layer containing a negative electrode active material; and
a solid electrolyte layer containing a solid electrolyte and a porous polyimide film which holds the solid electrolyte,
wherein the porous polyimide film (i) has pores with a spherical shape, (ii) has a void ratio of 60% or more and 80% or less, and (iii) holds the solid electrolyte filled in the pores at a filling rate of 55% or more, and wherein a number of the pores having a ratio (long diameter/short diameter) of long diameter to short diameter of 5 or more is 20% or less.

13. The all-solid-state battery according to claim 12, wherein the porous polyimide film has a void ratio of 60% or more and 77% or less.

* * * * *